United States Patent
Hu et al.

(10) Patent No.: US 11,259,185 B2
(45) Date of Patent: *Feb. 22, 2022

(54) COMMUNICATION METHOD AND DEVICE

(71) Applicant: HUAWEI TECHNOLOGIES CO., LTD., Guangdong (CN)

(72) Inventors: Li Hu, Shanghai (CN); Jing Chen, Shanghai (CN); He Li, Shanghai (CN); Kai Pan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/023,748

(22) Filed: Sep. 17, 2020

(65) Prior Publication Data

US 2021/0067954 A1 Mar. 4, 2021

Related U.S. Application Data

(63) Continuation of application No. 16/585,978, filed on Sep. 27, 2019, now Pat. No. 10,805,793, which is a
(Continued)

(51) Int. Cl.
*H04W 8/20* (2009.01)
*H04W 12/40* (2021.01)
(Continued)

(52) U.S. Cl.
CPC ............ *H04W 12/40* (2021.01); *H04L 63/08* (2013.01); *H04W 8/20* (2013.01); *H04W 12/06* (2013.01)

(58) Field of Classification Search
CPC .... H04W 12/004; H04W 12/06; H04W 12/40
See application file for complete search history.

(56) References Cited

U.S. PATENT DOCUMENTS 9,231,820 B2 1/2016 Murphy et al.
10,362,511 B2 * 7/2019 Youn ................. H04W 36/0011
(Continued)

FOREIGN PATENT DOCUMENTS

CN 102905265 A 1/2013
CN 105934926 A 9/2016
(Continued)

OTHER PUBLICATIONS

3GPP TSG SA WG3 (Security) Meeting #86, S3-170168, : "pCR to TR 33.899: Removal of Editor's Notes of Solution 8.1", Feb. 6-10, 2017, Sophia Antipolis (France), total 6 pages.
(Continued)

*Primary Examiner* — Michael T Vu
(74) *Attorney, Agent, or Firm* — Womble Bond Dickinson (US) LLP

(57) ABSTRACT

The present disclosure discloses a communication method performed by a management function entity, including: receiving a first request message sent by user equipment UE; sending a second request message to a storage function entity based on the first request message, where the second request message is used to request a security service identifier for the UE, and the security service identifier is used to indicate a security service procedure; receiving a response message including the security service identifier from the storage function entity; obtaining a target security service identifier based on the security service identifier, where the target security service identifier is used to indicate a security service procedure to be initiated by the management function entity; and initiating the security service procedure indicated by the target security service identifier. The present disclosure further discloses a communications device.

18 Claims, 15 Drawing Sheets

Related U.S. Application Data continuation of application No. PCT/CN2017/079130, filed on Mar. 31, 2017.

(51) Int. Cl.
*H04L 29/06* (2006.01)
*H04W 12/06* (2021.01)

(56) References Cited

U.S. PATENT DOCUMENTS

| | | | |
|---|---|---|---|
| 10,687,300 B2* | 6/2020 | Youn | H04W 60/06 |
| 2016/0374134 A1 | 12/2016 | Kweon et al. | |
| 2017/0012947 A1 | 1/2017 | Lee et al. | |
| 2018/0167807 A1 | 6/2018 | Ying et al. | |
| 2018/0376445 A1* | 12/2018 | Yoon | H04W 68/005 |
| 2019/0007921 A1* | 1/2019 | Schliwa-Bertling | H04W 76/25 |

FOREIGN PATENT DOCUMENTS

| | | |
|---|---|---|
| CN | 106507348 A | 3/2017 |
| EP | 2725829 A2 | 4/2014 |
| WO | 2017024579 A1 | 2/2017 |

OTHER PUBLICATIONS

Ericsson, "23.502: Handover between 3GPP and non-3GPP access",SA WG2 Meeting #120,S2-171752, Mar. 27-31, 2017, Busan, Korea,total 8 pages.

Qualcomm Incorporated,"TS 23.502: MM and SM interactions for MICO Ues",SA WG2 Meeting #S2-120, S2-171709, Mar. 27-31, 2017, Busan, South Korea,total 17 pages.

3GPP TS 23.502 V0.2 0 (Feb. 2017),3rd Generation Partnership Project;Technical Specification Group Services and System Aspects;Procedures for the 5G System;Stage 2(Release 15),total 71 pages.

3GPP TR 33.899 V1.0.0,:"3rd Generation Partnership Project;Technical Specification Group Services System Aspects;Study on the security aspects of the next generation system (Release 14)", Dated Mar. 2017. total 472 pages.

3GPP TS 23.501 V0.3 1 (Mar. 2017);3rd Generation Partnership Project;Technical Specification Group Services and System Aspects;System Architecture for the 5G System;Stage 2(Release 15);total 97 pages.

ETRI,"TS 23.502 N11 Procedure for Registration Area Allocation",SA WG2 Meeting #120,S2-172145, Mar. 27-31, 2017, Busan, South Korea,total 10 pages.

NEC,"pCR to TR 33.899 Security procedure for NextGen networks with NAS-SM",3GPP TSG SA WG3 (Security) Meeting #86 53-170385, Feb. 6-10, 2017, Sophia Antipolis (France),total 5 pages.

Huawei, HiSilicon,"TS 23.502: Replacing information flows by UDM service presentation",SA WG2 Meeting #120, S2-172286, Mar. 27-31, 2017, Busan, Korea,total 12 pages.

Huawei et al.,"A solution for equipment identifier authentication using EAP",3GPP TSG SA WG3 (Security) Meeting #86 S3-170123, Feb. 6-10, 2017, Sophia Antipolis (France),total 3 pages.

Nokia,"Merge of S3-270177 S3-170279 S3-170298 EAP based Secondary authentication proposals",3GPP TSG SA WG3 (Security) Meeting #86 S3-170405, Feb. 6-10, 2017, Nice, France,total 6 pages.

* cited by examiner

COMMUNICATION METHOD AND DEVICE

CROSS-REFERENCE TO RELATED APPLICATIONS

This application is a continuation of U.S. patent application Ser. No. 16/585,978, filed on Sep. 27, 2019, which is a continuation of International Application No. PCT/CN2017/079130, filed on Mar. 31, 2017, the disclosure of which is hereby incorporated by reference in its entirety.

TECHNICAL FIELD

The present disclosure relates to the field of 5G communication, and in particular, to a communication method and a device.

BACKGROUND

With development of communications technologies, a requirement for data security changes. Different users may have different requirements for data security. For example, high-end users such as politicians and executives have higher requirements for data security, and need to subscribe to related security services to improve security performance. Different services may also have different requirements for data security. For example, an internet of vehicles and a public-security trunked radio system have different requirements for data security. Different security requirements have specific impact on system performance.

In the prior art, security is implemented by using only a subscription authentication procedure, but requirements of a user and a service for data security cannot be met.

SUMMARY

Embodiments of the present disclosure disclose a communication method and a device, to meet requirements of a user and a service for data security.

According to a first aspect, an embodiment of the present disclosure provides a communication method, including: receiving, by a management function entity, a first request message sent by user equipment UE; sending, by the management function entity, a second request message to a storage function entity based on the first request message, where the second request message is used to request a security service identifier for the UE, and the security service identifier is used to indicate a security service procedure; receiving, by the management function entity, a response message sent by the storage function entity, where the response message includes the security service identifier; obtaining, by the management function entity, a target security service identifier based on the security service identifier, where the target security service identifier is used to indicate a security service procedure to be initiated by the management function entity; and initiating, by the management function entity, the security service procedure indicated by the target security service identifier, where in comparison with the prior art, in this embodiment of the present disclosure, after receiving the first request message sent by the UE, the management function entity sends the second request message to the storage function entity, to obtain a security service identifier that is required by the UE and that corresponds to the security service procedure to be initiated by the management function entity. The management function entity initiates the security service procedure corresponding to the security service identifier and executes the security service procedure with the UE, so that a security service procedure is obtained based on a requirement, and requirements of a user and a service for data security are met.

In a feasible embodiment, the management function entity includes an access and mobility management function AMF entity, the security service identifier includes a mobility management MM security service identifier, and the target security service identifier includes an AMF MM security service identifier; and the MM security service identifier is used to indicate an MM security service procedure, and the AMF MM security service identifier is used to indicate an MM security service procedure to be initiated by the AMF entity.

In a feasible embodiment, the storage function entity includes a unified data management UDM function entity, the second request message is an authentication data request, and the response message is an authentication data response; or the storage function entity includes a UDM function entity, the second request message includes a location update request, and the response message is a location update response; or the storage function entity includes a policy control function PCF entity, the second request message is a UE context establishment request, and the response message is a UE context establishment response.

In a feasible embodiment, the first request message includes an MM security service capability of the UE, and the MM security service capability of the UE is used to indicate an MM security service procedure supported by the UE; and the obtaining, by the management function entity, a target security service identifier based on the security service identifier includes: obtaining, by the AMF entity, the AMF MM security service identifier based on the MM security service identifier and the MM security service capability of the UE, where the AMF MM security service identifier is used to indicate an MM security service procedure to be initiated by the AMF entity, where the MM security service capability of the UE is introduced, so that a security service procedure required by the UE is specifically obtained.

In a feasible embodiment, the obtaining, by the AMF entity, the AMF MM security service identifier based on the MM security service identifier and the MM security service capability of the UE includes: obtaining, by the AMF entity, the AMF MM security service identifier based on the MM security service identifier, the MM security service capability of the UE, and an MM security service capability of the AMF entity, where the MM security service capability of the AMF entity is used to indicate an MM security service procedure supported by the AMF entity, where the MM security service procedure indicated by the AMF MM security service identifier is an MM security service procedure supported by both the UE and the AMF entity and initiated by the AMF entity, where the MM security service capability of the UE and the MM security service capability of the AMF entity are introduced, so that the UE and the AMF entity obtain corresponding MM security service identifiers through negotiation.

In a feasible embodiment, the security service identifier further includes a session management SM security service identifier. The storage function entity obtains the MM security service identifier and the SM security service identifier at one time, thereby reducing signaling interaction and improving efficiency of obtaining a security service procedure.

In a feasible embodiment, the first request message includes an SM security service capability of the UE, and the SM security service capability of the UE is used to indicate an SM security service procedure supported by the UE; and the method further includes: storing, by the AMF entity, the SM security service identifier and the SM security service capability of the UE.

In a feasible embodiment, the management function entity includes a session management function SMF entity, the security service identifier includes an SM security service identifier, and the target security service identifier includes an SMF SM security service identifier; and the SM security service identifier is used to indicate an SM security service procedure, and the SMF SM security service identifier is used to indicate an SM security service procedure to be initiated by the SMF entity.

In a feasible embodiment, the storage function entity includes a UDM function entity, the second request message is a subscription data request, and the response message is a subscription data response; or the storage function entity includes a PCF entity, the second request message is a packet data unit-connectivity access network PDU-CAN session establishment request, and the response message is a PDU-CAN session establishment response.

In a feasible embodiment, the first request message includes an SM security service capability of the UE, and the SM security service capability of the UE is used to indicate an SM security service procedure supported by the UE; and the obtaining, by the management function entity, a target security service identifier based on the security service identifier includes: obtaining, by the SMF entity, the SMF SM security service identifier based on the SM security service identifier and the SM security service capability of the UE, where the SMF SM security service identifier is used to indicate an SM security service procedure to be initiated by the SMF entity, where the SM security service capability of the UE is introduced, so that the SM security service procedure supported by the UE is specifically obtained.

In a feasible embodiment, the obtaining, by the SMF entity, the SMF SM security service identifier based on the SM security service identifier and the SM security service capability of the UE includes: obtaining, by the SMF entity, the SMF SM security service identifier based on the SM security service identifier, the SM security service capability of the UE, and an SM security service capability of the SMF entity, where the SM security service capability of the SMF entity is used to indicate an SM security service procedure supported by the SMF entity, where the SM security service procedure identified by the SMF SM security service identifier is a security service procedure supported by both the UE and the SMF entity and initiated by the SMF entity, where the SM security service capability of the UE and the SM security service capability of the SMF entity are introduced, so that the UE and the SMF entity obtain corresponding SM security service identifiers through negotiation.

According to a second aspect, an embodiment of the present disclosure further provides a communication method, including: receiving, by a management function entity, a first request message sent by user equipment UE; receiving, by the management function entity, the first request message, and sending a second request message to a storage function entity, where the second request message is used to request a security service identifier for the UE, and the security service identifier is used to indicate a security service procedure; receiving, by the management function entity, a response message sent by the storage function entity, where the response message includes the security service identifier; obtaining, by the management function entity, a target security service identifier based on the security service identifier, where the target security service identifier is used to indicate a security service procedure to be initiated by the UE; and sending, by the management function entity, the target security service identifier to the UE.

In a feasible embodiment, the management function entity includes an access and mobility management function AMF entity, the security service identifier includes a mobility management MM security service identifier, and the target security service identifier includes a UE MM security service identifier; and the MM security service identifier is used to indicate an MM security service procedure, and the UE MM security service identifier is used to indicate an MM security service procedure to be initiated by the UE.

In a feasible embodiment, the storage function entity includes a unified data management UDM function entity, the second request message is an authentication data request, and the response message is an authentication data response; or the storage function entity is a UDM function entity, the second request message is a location update request, and the response message is a location update response; or the storage function entity includes a policy control function PCF entity, the second request message is a UE context establishment request, and the response message is a UE context establishment response.

In a feasible embodiment, the first request message includes an MM security service capability of the UE, and the MM security service capability of the UE is used to indicate an MM security service procedure supported by the UE; and the obtaining, by the management function entity, a target security service identifier based on the security service identifier includes: obtaining, by the AMF entity, the UE MM security service identifier based on the MM security service identifier and the MM security service capability of the UE.

In a feasible embodiment, the obtaining, by the AMF entity, the UE MM security service identifier based on the MM security service identifier and the MM security service capability of the UE includes: obtaining, by the AMF entity, the UE MM security service identifier based on the MM security service identifier, the MM security service capability of the UE, and an MM security service capability of the AMF entity, where the MM security service capability of the AMF entity is used to indicate an MM security service procedure supported by the AMF entity, where the MM security service procedure indicated by the UE MM security service identifier is an MM security service procedure supported by both the UE and the AMF entity and initiated by the UE.

In a feasible embodiment, the security service identifier further includes a session management SM security service identifier.

In a feasible embodiment, the first request message includes an SM security service capability of the UE, and the SM security service capability of the UE is used to indicate an SM security service procedure supported by the UE; and the method further includes: storing, by the AMF entity, the SM security service identifier and the SM security service capability of the UE.

In a feasible embodiment, the management function entity includes a session management function SMF entity, the security service identifier includes an SM security service identifier, and the target security service identifier includes a UE SM security service identifier; and the SM security service identifier is used to indicate an SM security service procedure, and the UE SM security service identifier is used to indicate an SM security service procedure to be initiated by the UE.

In a feasible embodiment, the storage function entity includes a UDM function entity, the second request message is a subscription data request, and the response message is a subscription data response; or the storage function entity includes a PCF entity, the second request message is a packet data unit-connectivity access network PDU-CAN session establishment request, and the response message is a PDU-CAN session establishment response.

In a feasible embodiment, the first request message includes an SM security service capability of the UE, and the SM security service capability of the UE is used to indicate an SM security service procedure supported by the UE; and the obtaining, by the management function entity, a target security service identifier based on the security service identifier includes: obtaining, by the SMF entity, the UE SM security service identifier based on the SM security service identifier and the SM security service capability of the UE.

In a feasible embodiment, the obtaining, by the SMF entity, the UE SM security service identifier based on the SM security service identifier and the SM security service capability of the UE includes: obtaining, by the SMF entity, the UE SM security service identifier based on the SM security service identifier, the SM security service capability of the UE, and an SM security service capability of the SMF entity, where the SM security service capability of the SMF entity is used to indicate an SM security service procedure supported by the SMF entity, where the SM security service procedure indicated by the UE SM security service identifier is a security service procedure supported by both the UE and the SMF entity and initiated by the UE.

According to a third aspect, an embodiment of the present disclosure provides a communication method, including: receiving, by a storage function entity, a request message from a management function entity, where the request message is used to request a security service identifier for user equipment UE, and the request message includes an identifier ID of the UE or an identifier of a slice service; obtaining, by the storage function entity, the security service identifier based on the ID of the UE or the identifier of the slice service; and sending, by the storage function entity, a response message to the management function entity, where the response message includes the security service identifier, and the security service identifier is used to indicate a security service procedure, where the storage function entity obtains, based on the ID of the UE or the identifier of the slice service, a security service identifier required by the UE or the slice service, to prepare for obtaining security services for the UE and the service based on requirements.

In a feasible embodiment, the management function entity includes an access and mobility management function AMF entity, the security service identifier includes a mobility management MM security service identifier, and the MM security service identifier is used to indicate an MM security service procedure; or the management function entity includes an AMF entity, the security service identifier includes an MM security service identifier and a session management SM security service identifier, and the SM security service identifier is used to indicate an SM security service procedure.

In a feasible embodiment, the storage function entity includes a unified data management UDM function entity, the request message is an authentication data request, and the response message is an authentication data response; or the storage function entity includes a UDM function entity, the request message is a location update request, and the response message is a location update response; or the storage function entity includes a policy control function PCF entity, the request message is a UE context establishment request, and the response message is a UE context establishment response.

In a feasible embodiment, the management function entity includes a session management function SMF entity, the security service identifier includes an SM security service identifier, and the SM security service identifier is used to indicate an SM security service procedure.

In a feasible embodiment, the storage function entity includes a UDM function entity, the request message is a subscription data request, and the response message is a subscription data response; or the storage function entity includes a PCF entity, the request message is a packet data unit-connectivity access network PDU-CAN session establishment request, and the response message is a PDU-CAN session establishment response.

According to a fourth aspect, an embodiment of the present disclosure provides a communication method, including: sending, by user equipment UE, a request message to a management function entity; receiving, by the UE, a security service identifier from the management function entity, where the security service identifier is used to indicate a security service procedure to be initiated by the UE; and initiating, by the UE, the security service procedure indicated by the security service identifier, where in comparison with the prior art, in this embodiment of the present disclosure, the UE sends the request message to the management function entity, to obtain a security service identifier that is required by the UE and that corresponds to the security service procedure; and initiates the security service procedure and completes the security service procedure with the management function entity, to meet a requirement of the UE for data security.

In a feasible embodiment, the management function entity includes an access and mobility management function AMF entity, and the security service identifier includes a session management SM security service identifier or a mobility management MM security service identifier; and the SM security service identifier is used to indicate an SM security service procedure, and the MM security service identifier is used to indicate an MM security service procedure.

In a feasible embodiment, the management function entity includes a session management function SMF entity, the security service identifier includes an SM security service identifier, and the SM security service identifier is used to indicate an SM security service procedure.

According to a fifth aspect, an embodiment of the present disclosure further provides a communication method, including: receiving, by a session management function SMF entity, a session management SM security service identifier of user equipment UE and an SM security service capability of the UE from an access and mobility management function AMF entity, where the SM security service identifier is used to indicate an SM security service procedure, and the SM security service capability of the UE is used to indicate an SM security service procedure supported by the UE; obtaining, by the SMF entity, an SMF SM security service identifier based on the SM security service identifier and the SM security service capability of the UE, where the SMF SM security service identifier is used to indicate an SM security service procedure to be initiated by the SW' entity; and initiating, by the SMF entity, the SM security service procedure indicated by the SMF SM security service identifier, where the SMF entity directly receives the SM security service identifier sent by the AMF, thereby reducing signaling interaction and improving efficiency of obtaining a security service procedure.

In a feasible embodiment, the obtaining, by the SMF entity, an SMF SM security service identifier based on the SM security service identifier and the SM security service capability of the UE includes: obtaining, by the SMF entity, the SMF SM security service identifier based on the SM security service identifier, the SM security service capability of the UE, and an SM security service capability of the SMF entity, where the SM security service capability of the SMF entity is used to indicate an SM security service procedure supported by the SMF entity, where the SM security service procedure indicated by the SMF SM security service identifier is a security service procedure supported by both the UE and the SMF entity and initiated by the SMF entity.

According to a sixth aspect, the present disclosure provides a communication method, including: receiving, by an SMF entity, an SM security service identifier of user equipment UE and an SM security service capability of the UE from an AMF entity, where the SM security service identifier is used to indicate an SM security service procedure, and the SM security service capability of the UE is used to indicate an SM security service procedure supported by the UE; obtaining, by the SMF entity, a UE SM security service identifier based on the SM security service identifier and the SM security service capability of the UE, where the UE SM security service identifier is used to indicate an SM security service procedure to be initiated by the UE; and sending, by the SMF entity, the UE SM security service identifier to the UE.

In a feasible embodiment, the obtaining, by the SMF entity, a UE SM security service identifier based on the SM security service identifier and the SM security service capability of the UE includes: obtaining, by the SMF entity, the UE SM security service identifier based on the SM security service identifier, the SM security service capability of the UE, and an SM security service capability of the SMF entity, where the SM security service capability of the SMF entity is used to indicate an SM security service procedure supported by the SMF entity, where the SM security service procedure indicated by the UE SM security service identifier is a security service procedure supported by both the UE and the SMF entity and initiated by the UE.

According to a seventh aspect, an embodiment of the present disclosure provides a management function entity, including: a first receiving module, configured to receive a first request message sent by user equipment UE; a sending module, configured to send a second request message to a storage function entity based on the first request message, where the second request message is used to request a security service identifier for the UE, and the security service identifier is used to indicate a security service procedure; a second receiving module, configured to receive a response message sent by the storage function entity, where the response message includes the security service identifier; an obtaining module, configured to obtain a target security service identifier based on the security service identifier, where the target security service identifier is used to indicate a security service procedure to be initiated by the management function entity; and an initiation module, configured to initiate the security service procedure indicated by the target security service identifier.

In a feasible embodiment, the management function entity includes an access and mobility management function AMF entity, the security service identifier includes a mobility management MM security service identifier, and the target security service identifier includes an AMF MM security service identifier; and the MM security service identifier is used to indicate an MM security service procedure, and the AMF MM security service identifier is used to indicate an MM security service procedure to be initiated by the AMF entity.

In a feasible embodiment, the storage function entity includes a unified data management UDM function entity, the second request message is an authentication data request, and the response message is an authentication data response; or the storage function entity includes a UDM function entity, the second request message is a location update request, and the response message is a location update response; or the storage function entity includes a policy control function PCF entity, the second request message is a UE context establishment request, and the response message is a UE context establishment response.

In a feasible embodiment, the first request message includes an MM security service capability of the UE, and the MM security service capability of the UE is used to indicate an MM security service procedure supported by the UE; and the obtaining module includes: a first obtaining unit, configured to obtain the AMF MM security service identifier based on the MM security service identifier and the MM security service capability of the UE, where the AMF MM security service identifier is used to indicate an MM security service procedure to be initiated by the AMF entity.

In a feasible embodiment, the first obtaining unit is further configured to obtain the AMF MM security service identifier based on the MM security service identifier, the MM security service capability of the UE, and an MM security service capability of the AMF entity, where the MM security service capability of the AMF entity is used to indicate an MM security service procedure supported by the AMF entity; and the MM security service procedure indicated by the AMF MM security service identifier is an MM security service procedure supported by both the UE and the AMF entity and initiated by the AMF entity.

In a feasible embodiment, the security service identifier further includes a session management SM security service identifier.

In a feasible embodiment, the first request message includes an SM security service capability of the UE, and the SM security service capability of the UE is used to indicate an SM security service procedure supported by the UE; and the management function entity further includes: a storage module, configured to store the SM security service identifier and the SM security service capability of the UE.

In a feasible embodiment, the management function entity includes a session management function SMF entity, the security service identifier includes an SM security service identifier, and the target security service identifier includes an SMF SM security service identifier; and the SM security service identifier is used to indicate an SM security service procedure, and the SMF SM security service identifier is used to indicate an SM security service procedure to be initiated by the SMF entity.

In a feasible embodiment, the storage function entity includes a UDM function entity, the second request message is a subscription data request, and the response message is a subscription data response; or the storage function entity includes a PCF entity, the second request message is a packet data unit-connectivity access network PDU-CAN session establishment request, and the response message is a PDU-CAN session establishment response.

In a feasible embodiment, the first request message includes an SM security service capability of the UE, and the SM security service capability of the UE is used to indicate an SM security service procedure supported by the UE; and the obtaining module includes: a second obtaining unit, configured to obtain the SMF SM security service identifier based on the SM security service identifier and the SM security service capability of the UE, where the SMF SM security service identifier is used to indicate an SM security service procedure to be initiated by the SMF entity.

In a feasible embodiment, the second obtaining unit is further configured to obtain the SMF SM security service identifier based on the SM security service identifier, the SM security service capability of the UE, and an SM security service capability of the SMF entity, where the SM security service capability of the SMF entity is used to indicate an SM security service procedure supported by the SMF entity; and the SM security service procedure identified by the SMF SM security service identifier is a security service procedure supported by both the UE and the SMF entity and initiated by the SMF entity.

According to an eighth aspect, an embodiment of the present disclosure further provides a management function entity, including: a first receiving module, configured to receive a first request message sent by user equipment UE; a first sending module, configured to send a second request message to a storage function entity, where the second request message is used to request a security service identifier for the UE, and the security service identifier is used to indicate a security service procedure; a second receiving module, configured to receive a response message sent by the storage function entity, where the response message includes the security service identifier; an obtaining module, configured to obtain a target security service identifier based on the security service identifier, where the target security service identifier is used to indicate a security service procedure to be initiated by the UE; and a second sending module, configured to send the target security service identifier to the UE.

In a feasible embodiment, the management function entity includes an access and mobility management function AMF entity, the security service identifier includes a mobility management MM security service identifier, and the target security service identifier includes a UE MM security service identifier; and the MM security service identifier is used to indicate an MM security service procedure, and the UE MM security service identifier is used to indicate an MM security service procedure to be initiated by the UE.

In a feasible embodiment, the storage function entity includes a unified data management UDM function entity, the second request message is an authentication data request, and the response message is an authentication data response; or the storage function entity is a UDM function entity, the second request message is a location update request, and the response message is a location update response; or the storage function entity includes a policy control function PCF entity, the second request message is a UE context establishment request, and the response message is a UE context establishment response.

In a feasible embodiment, the first request message includes an MM security service capability of the UE, and the MM security service capability of the UE is used to indicate an MM security service procedure supported by the UE; and the obtaining module includes: a first obtaining unit, configured to obtain the UE MM security service identifier based on the MM security service identifier and the MM security service capability of the UE.

In a feasible embodiment, the first obtaining unit is further configured to obtain the UE MM security service identifier based on the MM security service identifier, the MM security service capability of the UE, and an MM security service capability of the AMF entity, where the MM security service capability of the AMF entity is used to indicate an MM security service procedure supported by the AMF entity, and the MM security service procedure indicated by the UE MM security service identifier is a security service procedure supported by both the UE and the AMF entity and initiated by the UE.

In a feasible embodiment, the security service identifier further includes a session management SM security service identifier.

In a feasible embodiment, the first request message includes an SM security service capability of the UE, and the SM security service capability of the UE is used to indicate an SM security service procedure supported by the UE; and the management function entity further includes: a storage module, configured to store the SM security service identifier and the SM security service capability of the UE.

In a feasible embodiment, the management function entity includes a session management function SMF entity, the security service identifier includes an SM security service identifier, and the target security service identifier includes a UE SM security service identifier; and the SM security service identifier is used to indicate an SM security service procedure, and the UE SM security service identifier is used to indicate an SM security service procedure to be initiated by the UE.

In a feasible embodiment, the storage function entity includes a UDM function entity, the second request message is a subscription data request, and the response message is a subscription data response; or the storage function entity includes a PCF entity, the second request message is a packet data unit-connectivity access network PDU-CAN session establishment request, and the response message is a PDU-CAN session establishment response.

In a feasible embodiment, the first request message includes an SM security service capability of the UE, and the SM security service capability of the UE is used to indicate an SM security service procedure supported by the UE; and the obtaining module includes: a second obtaining unit, configured to obtain the UE SM security service identifier based on the SM security service identifier and the SM security service capability of the UE.

In a feasible embodiment, the second obtaining unit is further configured to obtain the UE SM security service identifier based on the SM security service identifier, the SM security service capability of the UE, and an SM security service capability of the SMF entity, where the SM security service capability of the SMF entity is used to indicate an SM security service procedure supported by the SMF entity, and the SM security service procedure indicated by the UE SM security service identifier is a security service procedure supported by both the UE and the SMF entity and initiated by the UE.

According to a ninth aspect, an embodiment of the present disclosure provides a storage function entity, including: a receiving module, configured to receive a request message from a management function entity, where the request message is used to request a security service identifier for user equipment UE, and the request message includes an identifier ID of the UE or an identifier of a slice service; an obtaining module, configured to obtain the security service identifier based on the ID of the UE or the identifier of the slice service; and a sending module, configured to send a response message to the management function entity, where the response message includes the security service identifier, and the security service identifier is used to indicate a security service procedure.

In a feasible embodiment, the management function entity includes an access and mobility management function AMF entity, the security service identifier includes a mobility management MM security service identifier, and the MM security service identifier is used to indicate an MM security service procedure; or the management function entity includes an AMF entity, the security service identifier includes an MM security service identifier and a session management SM security service identifier, and the SM security service identifier is used to indicate an SM security service procedure.

In a feasible embodiment, the storage function entity includes a unified data management UDM function entity, the request message is an authentication data request, and the response message is an authentication data response; or the storage function entity includes a UDM function entity, the request message is a location update request, and the response message is a location update response; or the storage function entity includes a policy control function PCF entity, the request message is a UE context establishment request, and the response message is a UE context establishment response.

In a feasible embodiment, the management function entity includes a session management function SMF entity, the security service identifier includes an SM security service identifier, and the SM security service identifier is used to indicate an SM security service procedure.

In a feasible embodiment, the storage function entity includes a UDM function entity, the request message is a subscription data request, and the response message is a subscription data response; or the storage function entity includes a PCF entity, the request message is a packet data unit-connectivity access network PDU-CAN session establishment request, and the response message is a PDU-CAN session establishment response.

According to a tenth aspect, an embodiment of the present disclosure further provides user equipment UE, including: a sending module, configured to send a request message to a management function entity; a receiving module, configured to receive a security service identifier from the management function entity, where the security service identifier is used to indicate a security service procedure to be initiated by the UE; and an initiation module, configured to initiate the security service procedure indicated by the security service identifier.

In a feasible embodiment, the management function entity includes an access and mobility management function AMF entity, and the security service identifier includes a session management SM security service identifier or a mobility management MM security service identifier; and the SM security service identifier is used to indicate an SM security service procedure, and the MM security service identifier is used to indicate an MM security service procedure.

In a feasible embodiment, the management function entity includes a session management function SMF entity, the security service identifier includes an SM security service identifier, and the SM security service identifier is used to indicate an SM security service procedure.

According to an eleventh aspect, an embodiment of the present disclosure provides a session management function SMF entity, including: a receiving module, configured to receive a session management SM security service identifier of user equipment UE and an SM security service capability of the UE from an access and mobility management function AMF entity, where the SM security service identifier is used to indicate an SM security service procedure, and the SM security service capability of the UE is used to indicate an SM security service procedure supported by the UE; an obtaining module, configured to obtain an SMF SM security service identifier based on the SM security service identifier and the SM security service capability of the UE, where the SMF SM security service identifier is used to indicate an SM security service procedure to be initiated by the SMF entity; and an initiation module, configured to initiate the SM security service procedure indicated by the SMF SM security service identifier.

In a feasible embodiment, the obtaining module is further configured to obtain the SMF SM security service identifier based on the SM security service identifier, the SM security service capability of the UE, and an SM security service capability of the SMF entity, where the SM security service capability of the SMF entity is used to indicate an SM security service procedure supported by the SMF entity; and the SM security service procedure indicated by the SMF SM security service identifier is a security service procedure supported by both the UE and the SMF entity and initiated by the SMF entity.

According to a twelfth aspect, an embodiment of the present disclosure further provides a session management function SMF entity, including: a receiving module, configured to receive an SM security service identifier of user equipment UE and an SM security service capability of the UE from an AMF entity, where the SM security service identifier is used to indicate an SM security service procedure, and the SM security service capability of the UE is used to indicate an SM security service procedure supported by the UE; an obtaining module, configured to obtain a UE SM security service identifier based on the SM security service identifier and the SM security service capability of the UE, where the UE SM security service identifier is used to indicate an SM security service procedure to be initiated by the UE; and a sending module, configured to send the UE SM security service identifier to the UE.

In a feasible embodiment, the obtaining module is specifically configured to obtain the UE SM security service identifier based on the SM security service identifier, the SM security service capability of the UE, and an SM security service capability of the SMF entity, where the SM security service capability of the SMF entity is used to indicate an SM security service procedure supported by the SMF entity, and the SM security service procedure indicated by the UE SM security service identifier is a security service procedure supported by both the UE and the SMF entity and initiated by the UE.

According to a thirteenth aspect, an embodiment of the present disclosure provides a management function entity, including: a data memory storing executable program code; and a controller coupled to the data memory, where the controller invokes the executable program code stored in the data memory, to perform some or all of the operations described in the first aspect according to the embodiments of the present disclosure.

According to a fourteenth aspect, an embodiment of the present disclosure provides a management function entity, including: a data memory storing executable program code; and a controller coupled to the data memory, where the controller invokes the executable program code stored in the data memory, to perform some or all of the operations described in the second aspect according to the embodiments of the present disclosure.

According to a fifteenth aspect, an embodiment of the present disclosure provides a storage function entity, including: a data memory storing executable program code; and a controller coupled to the data memory, where the controller invokes the executable program code stored in the data memory, to perform some or all of the operations described in the third aspect according to the embodiments of the present disclosure.

According to a sixteenth aspect, an embodiment of the present disclosure provides user equipment, including: a data memory storing executable program code; and a controller coupled to the data memory, where the controller invokes the executable program code stored in the data memory, to perform some or all of the operations described in the fourth aspect according to the embodiments of the present disclosure.

According to a seventeenth aspect, an embodiment of the present disclosure provides a session management function SMF entity, including: a data memory storing executable program code; and a controller coupled to the data memory, where the controller invokes the executable program code stored in the data memory, to perform some or all of the operations described in the fifth aspect according to the embodiments of the present disclosure.

According to an eighteenth aspect, an embodiment of the present disclosure provides a session management function SMF entity, including: a data memory storing executable program code; and a controller coupled to the data memory, where the controller invokes the executable program code stored in the data memory, to perform some or all of the operations described in the sixth aspect according to the embodiments of the present disclosure.

It can be learned that in the solutions in the embodiments of the present disclosure, the UE obtains, from the storage function entity by using the management function entity, a security service identifier that is required by the UE and that corresponds to the security service procedure, and completes the security service procedure with the management function entity, thereby implementing requirements of a user and a service for data security. The security service capability is introduced, so that the UE and the management function entity obtain security service identifiers through negotiation, and complete security service procedures corresponding to the security service identifiers. The storage function entity obtains the MM security service identifier and the SM security service identifier at one time, thereby reducing signaling interaction and improving efficiency of obtaining a security service.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 1:
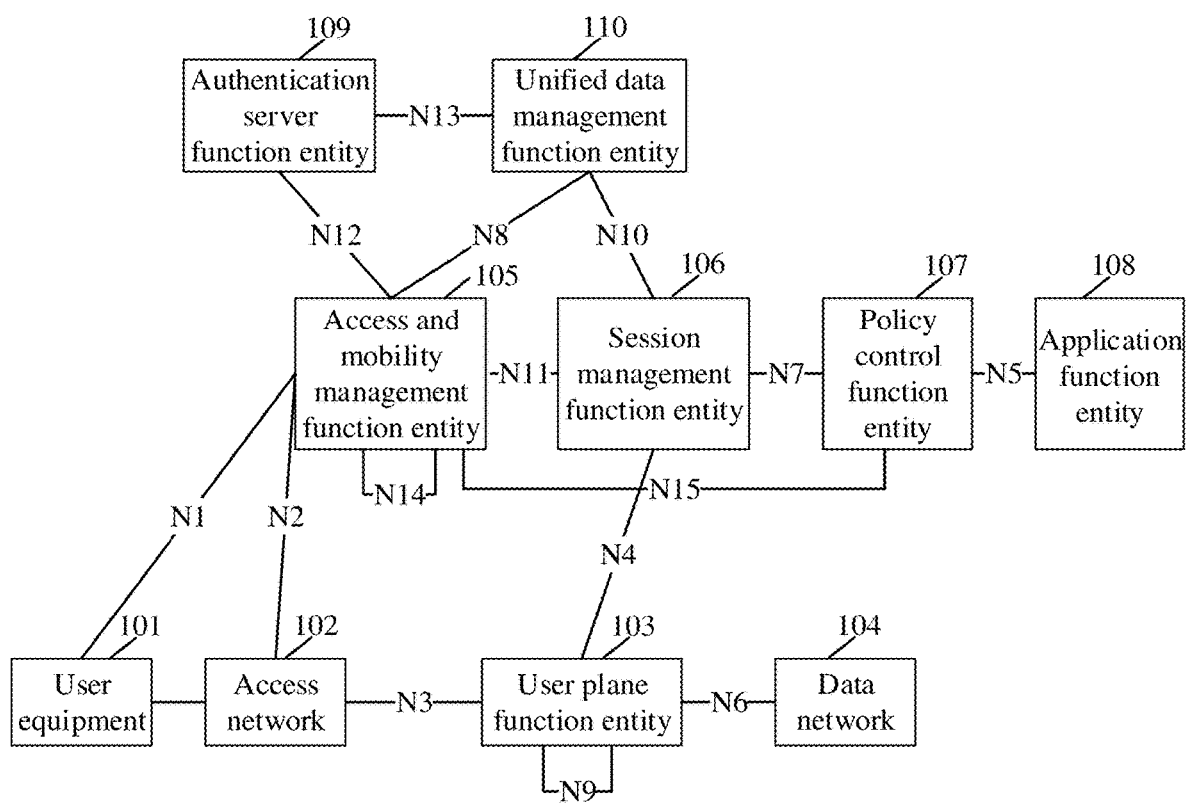
FIG. 1 is a schematic diagram of a network architecture according to an embodiment of the present disclosure.

FIG. 1 is a schematic diagram of a network architecture. A communication method provided in an embodiment of the present disclosure is implemented based on the network architecture.

As shown in FIG. 1, the network architecture includes user equipment (UE) 101, an access network (AN) 102, a user plane function (UPF) entity 103, a data network (DN) 104, an access and mobility management function (AMF) entity 105, a session management function (SMF) entity 106, a policy control function (PCF) entity 107, an application function (AF) entity 108, an authentication server function (AUSF) entity 109, and a unified data management (UDM) function entity 110.

The UE 101 is a device that provides a user with voice and/or data connectivity, for example, a handheld device or a vehicle-mounted device having a wireless connection function. For example, common terminals include a mobile phone, a tablet computer, a notebook computer, a palmtop computer, a mobile internet device (MID), and a wearable device such as a smart watch, a smart band, or a pedometer.

The AN 102 is similar to a base station in a conventional network, and includes an E-UTRAN NodeB (eNB). A next generation NodeB (gNB) provides a network access function for an authorized user in a specific area, and can use transmission tunnels with different quality based on a user level, a service requirement, and the like. The AN 102 can manage a radio resource and provide an access service for UE based on a requirement, to forward a control signal and user data between the UE and a core network.

The UPF entity 103 is configured to implement a user plane function of a core network, and is mainly responsible for service data transmission, such as packet forwarding. The UPF entity 103 communicates with the AN 102 through an interface N3. The UPF entity 103 communicates with another UPF entity through an interface N9.

The DN 104 represents a data network and provides a service for UE, including an operator server, an internet service, a third-party service, and the like. The DN 104 communicates with the UPF 103 through an interface N6.

The AMF entity 105 is configured to manage a mobile network, and is responsible for providing access and mobility support for UE. The AMF entity 105 includes functions such as registration management, reachability management, mobility management, access authentication, and access authorization. The AMF entity 105 communicates with the UE 101 through an interface N1. The AMF entity 105 communicates with the AN 102 through an interface N2. The AMF entity 105 communicates with another AMF entity through an interface N14.

The SMF entity 106 is configured to manage a session, and is responsible for providing session support for UE. The SMF entity 106 includes functions such as UE IP address allocation and management, session establishment, session change, session release, user plane function selection, and policy and QoS control. The SMF entity 106 communicates with the AMF entity 105 through an interface N11. The SMF entity 106 communicates with the UPF entity 103 through an interface N4.

The PCF entity 107 is configured to store some network policies, including some policies that reflect network behavior and a control plane policy. The PCF entity 107 communicates with the SMF entity 106 through an interface N7. The PCF entity 107 communicates with the AMF entity 105 through an interface N15.

The AF entity 108 is configured to provide an interface between a service and a 3GPP network, and includes functions such as guiding an application stream and enabling a network access capability. The AF entity 108 communicates with the PCF entity 107 through an interface N5.

The AUSF entity 109 is configured to provide a service authentication function, and mainly perform authentication on UE that is accessing a network. The AUSF entity 109 communicates with the AMF entity 105 through an interface N12.

The UDM function entity 110 is configured to store some user subscription information, including a long-term key used for authentication, user subscription information, and the like. The UDM function entity 110 communicates with the AUSF entity 109 through an interface N13. The UDM function entity 110 communicates with the AMF 105 through an interface N8. The UDM function entity 110 communicates with the SMF entity 106 through an interface N10.

When the UE 101 needs to register with a network, the UE 101 sends a registration request to the AMF entity 105 through the interface N1 or by using the AN 102 through the interface N2. The AMF entity 105 sends, to the UDM function entity 110 through the interface N8, a request for obtaining a security service identifier, or sends, to the PCF entity 107 through the interface N15, a request for obtaining a security service identifier. After obtaining the security service identifier, the UDM function entity 110 sends, to the AMF entity 105 through the interface N8, a response that includes the security service identifier. Alternatively, after obtaining the security service identifier, the PCF entity 107 sends, to the AMF entity 105 through the interface N15, a response that includes the security service identifier. The AMF entity 105 sends the security service identifier to the UE 101. The UE 101 or the AMF entity 105 initiates a security service procedure indicated by the security service identifier, and completes a subsequent registration procedure.

After the registration procedure is completed, the UE 101 sends a packet data unit (PDU) session establishment request to the AMF entity 105 through the interface N1 or by using the AN 102 through the interface N2. The AMF entity 105 sends a request message to the SMF entity 106 through the interface N11. The SMF entity 106 sends, to the UDM function entity 110 through the interface N10, a request for obtaining the security service identifier, or sends, to the PCF entity 107 through the interface N7, a request for obtaining the security service identifier. After obtaining the security service identifier, the UDM function entity 110 sends, to the SMF entity 106 through the interface N10, a response that includes the security service identifier. Alternatively, after obtaining the security service identifier, the PCF entity 107 sends, to the SMF entity 106 through the interface N7, a response that includes the security service identifier. The SMF entity 106 sends the security service identifier to the UE 101. The UE 101 or the SMF entity 106 initiates the security service procedure indicated by the security service identifier, and completes a subsequent PDU session establishment procedure.

Figure 2:
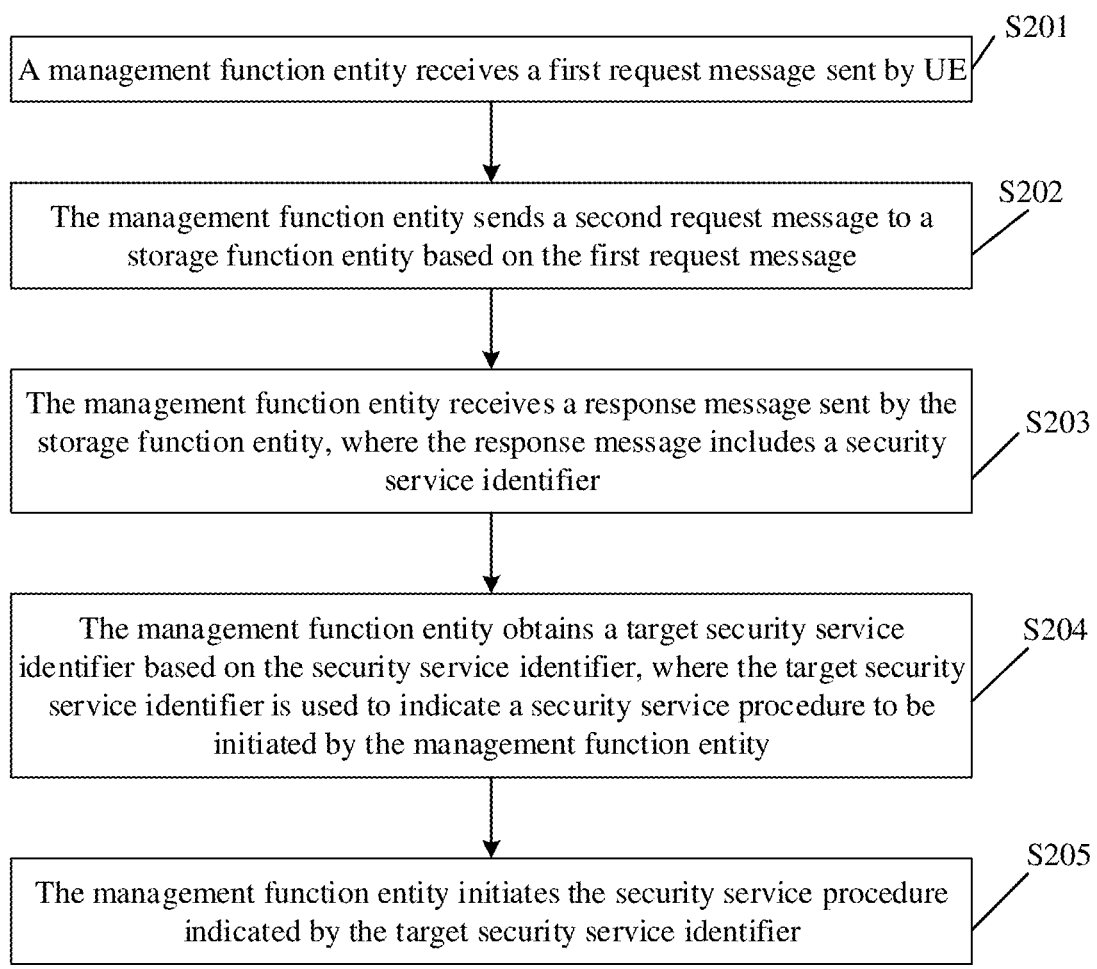
FIG. 2 is a schematic flowchart of a communication method according to an embodiment of the present disclosure.

FIG. 2 is a schematic flowchart of a communication method according to an embodiment of the present disclosure. As shown in FIG. 2, the method includes the following operations.

S201. A management function entity receives a first request message sent by UE.

The management function entity may include an AMF entity or an SMF entity, and the first request message may include a registration request or a PDU session establishment request.

For example, when the UE registers with a network, the UE sends a registration request to the AMF entity. When the UE establishes a PDU session, the UE sends a PDU session establishment request to the AMF entity, and then the AMF entity sends a session management (SM) request to the SMF entity, to request to establish the PDU session.

Further, the registration request may include an identifier ID of the UE, for example, a subscriber permanent identifier or a temporary user identifier, and may further include information such as network slice selection assistance information (NSSAI).

In one embodiment, the registration request includes at least one of a mobility management (MM) security service capability of the UE and an SM security service capability of the UE. The MM security service capability of the UE may be used to represent an MM security service procedure supported by the UE. The SM security service capability of the UE may be used to represent an SM security service procedure supported by the UE.

In one embodiment, the MM security service procedure may include a key exchange protocol (Diffie-Hellman, DH) exchange procedure or a device authentication procedure. The SM security service procedure may include a DH exchange procedure, a device authentication procedure, a user authentication procedure, a secondary authentication procedure, or an independent SM security service procedure.

The PDU session establishment request may include information such as session management-network slice selection assistance information (SM-NSSAI), a domain network name (DNN), and a PDU session ID.

In one embodiment, the PDU session establishment request includes the SM security service capability of the UE.

S202. The management function entity sends a second request message to a storage function entity based on the first request message.

The second request message is used to request a security service identifier for the UE, and the security service identifier is used to indicate a security service procedure. The security service identifier may include at least one of an MM security service identifier and an SM security service identifier.

The MM security service identifier may be used to indicate an MM security service procedure, for example, an MM security service procedure performed between the UE and the AMF entity. Further, the MM security service identifier may be used to indicate a sequence of initiating the security service procedure corresponding to the identifier. If the identifier is used to indicate only the security service procedure, the AMF entity or the UE may directly execute the security service procedure based on a pre-stored sequence. If the MM security service identifier is further used to indicate the sequence of initiating the security service procedure, the UE or the AMF entity may execute the security service procedure based on the sequence indicated by the MM security service identifier. In addition, there may be one or more MM security service identifiers. For example, there may be a set of MM security service identifiers.

The SM security service identifier may be used to indicate an SM security service procedure, for example, an SM security service procedure performed between the UE and the SMF entity. Further, the SM security service identifier may be used to indicate a sequence of initiating the security service procedure corresponding to the identifier. If the identifier is used to indicate only the security service procedure, but does not indicate the sequence of initiating the security service procedure, the SMF entity directly executes the security service procedure based on a pre-stored sequence. If the SM security service identifier indicates the sequence of initiating the security service procedure, the UE and the SMF entity execute the security service procedure based on the sequence indicated by the SM security service identifier. In addition, there may be one or more SM security service identifiers. For example, there may be a set of SM security service identifiers.

Initiating a security service procedure may be sending a first piece of signaling in the security service procedure, or triggering to send a first signaling message in the security service procedure.

In one embodiment, the security service procedure may include a DH exchange procedure, a device authentication procedure, a user authentication procedure, a secondary authentication procedure, or an independent SM security service procedure.

Specifically, the DH exchange procedure may start when the AMF entity sends a first message to the UE, and ends when the AMF entity receives and executes a second message sent by the UE. The first message is used to indicate a public key of the AMF entity, and the second message is used to indicate a public key of the UE. After accepting the second message, the AMF entity calculates, based on the public key of the UE and a private key of the AMF entity, a key shared with the UE.

In one embodiment, the DH exchange procedure may be initiated by the SMF entity and completed by the SMF entity and the UE, and an execution sequence is the same as that of the DH exchange and authentication procedure completed by the AMF and the UE.

Specifically, the device authentication procedure starts when the UE sends a third message to the AMF entity, and ends when the UE receives a fourth message sent by the AMF. The third message is used to indicate a device identifier of the UE, for example, an international mobile equipment identity (IMEI). The fourth message is used to indicate a result of the device authentication procedure.

In one embodiment, the device authentication procedure may be initiated by the UE and completed by the UE and the SMF entity, and an execution sequence is the same as that of the device authentication procedure completed by the AMF and the UE.

Specifically, the secondary authentication procedure starts when the UE sends a fifth message to the SMF entity, and ends when the UE receives a sixth message sent by the SMF. The fifth message is used to indicate authentication credentials of the UE, for example, a certificate, a device identifier, and an identity. The sixth message is used to indicate a result of the secondary authentication procedure.

Specifically, the user authentication procedure starts when the UE sends a seventh message to the SMF entity, and ends when the UE receives an eighth message sent by the SMF entity. The seventh message is used to indicate an identity, such as a fingerprint or a head image, of a user that uses the UE. The eighth message is used to indicate a result of the user authentication procedure.

Specifically, the independent SM security service procedure starts when the SMF entity sends a non-access stratum session management security mode command (NAS_SM Security Mode Command) message to the UE, and ends when the SMF entity receives a non-access stratum session management security mode complete (NAS_SM Security Mode Complete) message sent by the UE. The NAS_SM security mode command message is used to indicate an encryption algorithm and an integrity protection algorithm that are used between the UE and the SMF and that are selected by the SMF. After receiving the message, the UE derives an SM key. The NAS_SM security mode complete message is used to indicate that the UE determines that security activation is completed.

The storage function entity may be a UDM function entity or a PCF entity, or may be a network repository function (NRF) entity.

In one embodiment, the second request message includes an authentication data request, a location update request, a UE context establishment request, a subscription data request, or a PDU-connectivity access network session establishment request (PDU-Connectivity Access Network Establishment Request).

In one embodiment, the authentication data request includes information such as the identifier ID of the UE and the network slice selection assistance information (NSSAI). The location update request includes information such as the ID of the UE, for example, the subscriber permanent identifier or the user identifier.

In one embodiment, the management function entity includes the AMF entity, the security service identifier includes the MM security service identifier, a target security service identifier includes an AMF MM security service identifier, the MM security service identifier is used to indicate an MM security service procedure, and the AMF MM security service identifier is used to indicate an MM security service procedure to be initiated by the AMF entity.

In one embodiment, the management function entity includes the SMF entity, the security service identifier includes the SM security service identifier, the target security service identifier includes an SMF SM security service identifier, the SM security service identifier is used to indicate an SM security service procedure, and the SMF SM security service identifier is used to indicate an SM security service procedure to be initiated by the SMF entity.

S203. The management function entity receives a response message sent by the storage function entity, where the response message includes the security service identifier.

In one embodiment, the response message includes an authentication data response, a location update request, a UE context establishment request, a subscription data request, or a PDU-connectivity access network session establishment request.

In one embodiment, in block S203, the management function entity may obtain the MM security service identifier or the SM security service identifier by using the NRF entity.

In one embodiment, the target security service identifier includes the AMF MM security service identifier, and the AMF MM security service identifier is used to indicate an MM security service procedure to be initiated by the AMF entity.

Further, the storage function entity may include the UDM function entity, the second request message may be the authentication data request, the response message may be the authentication data response, and the authentication data response may be used to respond to the authentication data request.

Alternatively, the storage function entity may include the UDM function entity, the second request message may be the location update request, the response message may be the location update response, and the location update response may be used to respond to the location update request.

Alternatively, the storage function entity may include the PCF entity, the second request message may be the UE context establishment request, the response message may be the UE context establishment response, and the UE context establishment response may be used to respond to the UE context establishment request.

In one embodiment, the target security service identifier includes the SMF SM security service identifier, and the SMF SM security service identifier is used to indicate an SM security service procedure to be initiated by the SMF entity.

Further, the storage function entity may include the UDM function entity, the second request message may be the subscription data request, and the response message may be the subscription data response.

Alternatively, the storage function entity may include the UDM function entity, the second request message may be the PDU-CAN session establishment request, and the response message may be the PDU-CAN session establishment response.

In an example, when the AMF entity searches the UDM function entity to obtain the MM security service identifier or the SM security service identifier, the AMF entity sends the authentication data request or the location update request to the UDM function entity. When the AMF entity searches the PCF entity to obtain the MM security service identifier or the SM security service identifier, the AMF entity sends the UE context establishment request to the PCF entity. Alternatively, the AMF entity may search the NRF entity to obtain the MM security service identifier or the SM security service identifier. The NRF entity provides information storage for a network open function, including policy information storage, subscription storage, and the like.

In another example, when the SMF entity searches the UDM function entity to obtain the SM security service identifier, the SMF entity sends the subscription data request to the UDM function entity. When the SMF entity searches the PCF entity to obtain the SM security service identifier, the SMF entity sends the PDU-CAN session establishment request to the PCF entity. Alternatively, the SMF entity may search the NRF entity to obtain the SM security service identifier.

S204. The management function entity obtains the target security service identifier based on the security service identifier, where the target security service identifier is used to indicate a security service procedure to be initiated by the management function entity.

The target security service identifier may be one or more security service identifiers. This is not limited.

In one embodiment, the first request message further includes the MM security service capability of the UE, and the MM security service capability of the UE is used to indicate the MM security service procedure supported by the UE.

Further, in block S204, that the management function entity obtains the target security service identifier based on the security service identifier may include:

The AMF entity obtains the AMF MM security service identifier based on the MM security service identifier and the MM security service capability of the UE, where the AMF MM security service identifier is used to indicate an MM security service procedure to be initiated by the AMF entity.

Alternatively, the AMF entity obtains the AMF MM security service identifier based on the MM security service identifier, the MM security service capability of the UE, and an MM security service capability of the AMF entity, where the MM security service capability of the AMF entity is used to indicate an MM security service procedure supported by the AMF entity, the MM security service procedure indicated by the AMF MM security service identifier is an MM security service procedure supported by both the UE and the AMF entity and initiated by the AMF entity, and the MM security service capability of the AMF is stored in the AMF entity.

In one embodiment, the security service identifier further includes the SM security service identifier, the first request message further includes the SM security service capability of the UE, and the AMF entity stores the SM security service identifier and the SM security service capability of the UE.

For example, in a PDU session establishment process of the UE, the AMF entity may send the SM security service identifier and the SM security service capability of the UE to the SMF entity.

In one embodiment, the first request message may further include the SM security service capability of the UE, and the SM security service capability of the UE is used to indicate the SM security service procedure supported by the UE.

Further, in block S204, that the management function entity obtains the target security service identifier based on the security service identifier may include:

The SMF entity obtains the SMF SM security service identifier based on the SM security service identifier and the SM security service capability of the UE, where the SMF SM security service identifier is used to indicate an SM security service procedure to be initiated by the SMF entity.

Alternatively, the SMF entity obtains the SMF SM security service identifier based on the SM security service identifier, the SM security service capability of the UE, and an SM security service capability of the SMF entity, where the SM security service capability of the SMF entity is used to indicate an SM security service procedure supported by the SMF entity, the SM security service procedure indicated by the SMF SM security service identifier is an SM security service procedure supported by both the UE and the SMF entity and initiated by the SMF entity, and the SM security service capability of the SMF is stored in the SMF entity.

S205. The management function entity initiates the security service procedure indicated by the target security service identifier.

In one embodiment, the management function entity includes the AMF entity, the target security service identifier is the AMF MM security service identifier, and the AMF entity initiates the security service procedure indicated by the AMF MM security service identifier. After the AMF entity and the UE complete the security service procedure indicated by the AMF MM security service identifier, the AMF entity and the UE complete a subsequent registration procedure.

In one embodiment, the management function entity includes the SMF entity, the target security service identifier is the SMF SM security service identifier, and the SMF entity initiates the security service procedure indicated by the SMF SM security service identifier. After the SMF entity and the UE complete the security service procedure indicated by the SMF SM security service identifier, the SMF entity and the UE complete a subsequent registration procedure.

It can be learned that in the solution in this embodiment of the present disclosure, after receiving the first request message sent by the UE, the management function entity sends the second request message to the storage function entity, to obtain a security service identifier that is required by the UE and that corresponds to the security service procedure to be initiated by the management function entity. The management function entity initiates the security service procedure corresponding to the security service identifier and executes the security service procedure with the UE, so that a security service procedure is obtained based on a requirement, and requirements of a user and a service for data security are met.

In one embodiment, in a specific scenario of the foregoing embodiment, the management function entity is the AMF entity, the first request message is the registration request, the registration request may include the MM security service capability of the UE or the SM security service capability of the UE, the security service identifier may be the MM security service identifier or the SM security service identifier, the target security service identifier is the AMF MM security service identifier, the storage function entity is the UDM function entity or the PCF entity, and the second request message may include the authentication data request, the location update request, or the UE context establishment request. The foregoing communication process is as follows:

After the AMF entity receives the registration request sent by the UE, if the AMF entity sends the authentication data request to the UDM function entity, the AMF entity receives the authentication data response sent by the UDM function entity, to respond to the authentication data request, where the authentication data response may include the MM security service identifier or the SM security service identifier. If the AMF entity sends the location update request to the UDM function entity, the AMF entity receives the location update response sent by the UDM function entity, to respond to the location update request, where the location update response may include the MM security service identifier or the SM security service identifier. If the AMF entity sends the UE context establishment request to the PCF entity, the AMF entity receives the UE context establishment response sent by the PCF entity, to respond to the UE context establishment request, where the UE context establishment response includes the MM security service identifier or the SM security service identifier.

After the AMF entity obtains the MM security service identifier and the MM security service capability of the UE, the AMF entity obtains the AMF MM security service identifier based on the MM security service identifier and the MM security service capability of the UE, or the AMF entity obtains the AMF MM security service identifier based on the MM security service identifier, the MM security service capability of the UE, and the MM security service capability of the AMF. The AMF entity initiates the MM security service procedure indicated by the AMF MM security service identifier, and completes the MM security service procedure with the UE. Then, the AMF entity and the UE complete a subsequent registration procedure.

After the AMF entity obtains the SM security service identifier and the SM security service capability of the UE, the AMF entity stores the SM security service identifier and the SM security service capability of the UE. When the UE performs a PDU session establishment procedure, the AMF entity sends the SM security service identifier and the SM security service capability of the UE to the SMF entity.

In one embodiment, in another specific scenario of the foregoing embodiment, the management function entity is the SMF entity, the first request message is the PDU session establishment request, the PDU session establishment request may include the SM security service capability of the UE, the security service identifier may be the SM security service identifier, the target security service identifier is the SMF SM security service identifier, the storage function entity is the UDM function entity or the PCF entity, and the second request message may include the subscription data request or the PDU-CAN session establishment request. The foregoing communication process is as follows:

After receiving the PDU session establishment request sent by the UE, the AMF entity sends an SM request to the SMF entity, where the SM request includes information carried in the PDU session establishment request. If the SMF entity sends the subscription data request to the UDM function entity, the SMF entity receives the subscription data response sent by the UDM function entity, to respond to the subscription data request, where the subscription data response may include the SM security service identifier. If the SMF entity sends the PDU-CAN session establishment request to the PCF entity, the SMF entity receives the PDU-CAN session establishment response sent by the PCF entity, to respond to the PDU-CAN session establishment request, where the PDU-CAN session establishment response includes the SM security service identifier.

After the SMF entity obtains the SM security service identifier and the SM security service capability of the UE, the SMF entity obtains the SMF SM security service identifier based on the SM security service identifier and the SM security service capability of the UE, or the SMF entity obtains the SMF SM security service identifier based on the SM security service identifier, the SM security service capability of the UE, and the SM security service capability of the SMF. The SMF entity initiates the SM security service procedure indicated by the SMF SM security service identifier, and completes the SM security service procedure with the UE. Then, the SMF entity and the UE complete a subsequent PDU session establishment procedure.

Figure 3:
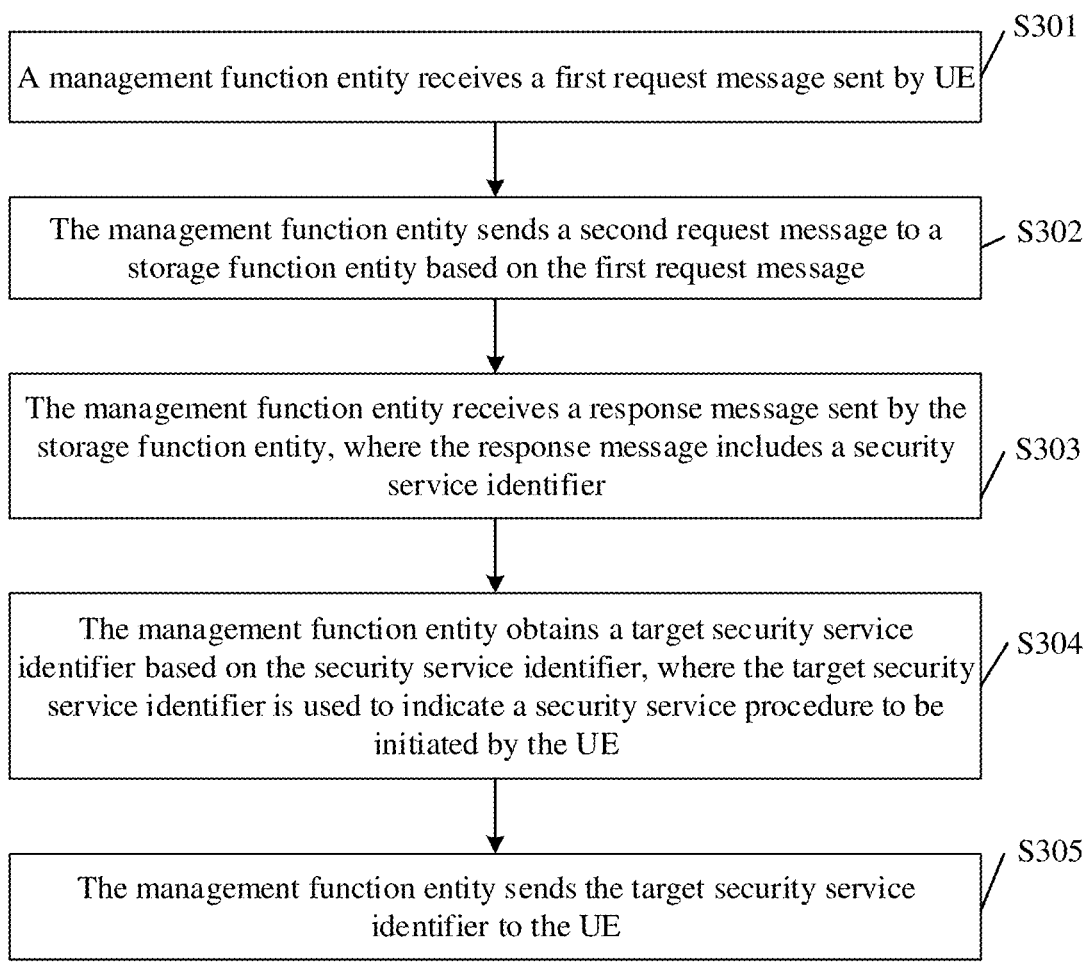
FIG. 3 is a schematic flowchart of another communication method according to an embodiment of the present disclosure.

FIG. 3 is a schematic flowchart of another communication method according to an embodiment of the present disclosure. As shown in FIG. 3, the method includes the following operations.

S301. A management function entity receives a first request message sent by UE.

S302. The management function entity receives the first request message, and sends a second request message to a storage function entity.

The second request message is used to request a security service identifier for the UE, and the security service identifier is used to indicate a security service procedure.

S303. The management function entity receives a response message sent by the storage function entity, where the response message includes the security service identifier.

For the management function entity, the security service identifier, the security service procedure, and the like, refer to related descriptions of the embodiment shown in FIG. 2. Details are not described again.

It should be noted that for descriptions of blocks S301 to S303, reference may be made to related descriptions of the foregoing blocks S201 to S203. Details are not described herein again.

S304. The management function entity obtains a target security service identifier based on the security service identifier, where the target security service identifier is used to indicate a security service procedure to be initiated by the UE.

S305. The management function entity sends the target security service identifier to the UE.

It can be learned that in the solution in this embodiment of the present disclosure, after receiving the first request message sent by the UE, the management function entity sends the second request message to the storage function entity, to obtain a security service identifier that is required by the UE and that corresponds to the security service procedure to be initiated by the UE. The UE initiates the security service procedure corresponding to the security service identifier and executes the security service procedure with the management function entity, so that a security service procedure is obtained based on a requirement, and requirements of a user and a service for data security are met.

In one embodiment, the management function entity includes an AMF entity, the security service identifier includes an MM security service identifier, and the target security service identifier includes a UE MM security service identifier.

The MM security service identifier is used to indicate an MM security service procedure, and the UE MM security service identifier is used to indicate an MM security service procedure to be initiated by the UE.

In one embodiment, the first request message includes an MM security service capability of the UE, and the MM security service capability of the UE is used to indicate an MM security service procedure supported by the UE.

Further, block S304 may include:

The AMF entity obtains the UE MM security service identifier based on the MM security service identifier and the MM security service capability of the UE, where the UE MM security service identifier is used to indicate an MM security service procedure to be initiated by the UE.

Alternatively, the AMF entity obtains the UE MM security service identifier based on the MM security service identifier, the MM security service capability of the UE, and an MM security service capability of the AMF entity, where the MM security service capability of the AMF entity is used to indicate an MM security service procedure supported by the AMF entity, and the MM security service procedure indicated by the UE MM security service identifier is an MM security service procedure supported by both the UE and the AMF entity and initiated by the UE.

In one embodiment, the security service identifier further includes an SM security service identifier, the first request message further includes an SM security service capability of the UE, and the AMF entity stores the SM security service identifier and the SM security service capability of the UE.

Further, when the UE performs a PDU session establishment process, the AMF sends the SM security service identifier and the SM security service capability of the UE to an SMF entity.

In one embodiment, the method further includes: The UE initiates the security service procedure indicated by the UE MM security service identifier. Further, after the UE and the AMF entity complete the MM security service procedure indicated by the UE MM security service identifier, the method may further include: The AMF entity and the UE complete a subsequent registration procedure.

The following performs description by using a specific example. The management function entity is the AMF entity, the first request message is a registration request, the registration request may include the MM security service capability of the UE or the SM security service capability of the UE, the security service identifier may be the MM security service identifier or the SM security service identifier, the target security service identifier is the UE MM security service identifier, the storage function entity is a UDM function entity or a PCF entity, and the second request message may include an authentication data request, a location update request, or a UE context establishment request. The foregoing communication process is as follows:

After the AMF entity receives the registration request sent by the UE, if the AMF entity sends the authentication data request to the UDM function entity, the AMF entity receives an authentication data response sent by the UDM function entity, to respond to the authentication data request, where the authentication data response may include the MM security service identifier or the SM security service identifier. If the AMF entity sends the location update request to the UDM function entity, the AMF entity receives a location update response sent by the UDM function entity, to respond to the location update request, where the location update response may include the MM security service identifier or the SM security service identifier. If the AMF entity sends the UE context establishment request to the PCF entity, the AMF entity receives a UE context establishment response sent by the PCF entity, to respond to the UE context establishment request, where the UE context establishment response includes the MM security service identifier or the SM security service identifier.

After the AMF entity obtains the MM security service identifier and the MM security service capability of the UE, the AMF entity obtains the UE MM security service identifier based on the MM security service identifier and the MM security service capability of the UE, or the AMF entity obtains the UE MM security service identifier based on the MM security service identifier, the MM security service capability of the UE, and the MM security service capability of the AMF. The UE initiates the MM security service procedure indicated by the UE MM security service identifier, and completes the MM security service procedure with the AMF entity. Then, the UE and the AMF entity complete a subsequent registration procedure.

After the AMF entity obtains the SM security service identifier and the SM security service capability of the UE, the AMF entity stores the SM security service identifier and the SM security service capability of the UE. When the UE performs a PDU session establishment procedure, the AMF entity sends the SM security service identifier and the SM security service capability of the UE to the SMF entity.

In one embodiment, the management function entity includes an SMF entity, the security service identifier includes an SM security service identifier, and the target security service identifier includes a UE SM security service identifier.

The SM security service identifier is used to indicate an SM security service procedure, and the UE SM security service identifier is used to indicate an SM security service procedure to be initiated by the UE.

In one embodiment, the first request message includes an SM security service capability of the UE, and the SM security service capability of the UE is used to indicate an SM security service procedure supported by the UE.

Further, block S304 may include:

The SMF entity obtains the UE SM security service identifier based on the SM security service identifier and the SM security service capability of the UE, where the UE SM security service identifier is used to indicate an SM security service procedure to be initiated by the UE.

Alternatively, the SMF entity obtains the UE SM security service identifier based on the SM security service identifier, the SM security service capability of the UE, and an SM security service capability of the SMF entity, where the SM security service capability of the SMF entity is used to indicate an SM security service procedure supported by the SMF entity, and the SM security service procedure indicated by the UE SM security service identifier is an SM security service procedure supported by both the UE and the SMF entity and initiated by the UE.

In one embodiment, the method further includes: The UE initiates the security service procedure indicated by the UE SM security service identifier. After the SMF entity and the UE complete the security service procedure indicated by the UE SM security service identifier, the method may further include: The SMF entity and the UE complete a subsequent registration procedure.

The following performs description by using a specific example. The management function entity is the SMF entity, the first request message is a PDU session establishment request, the PDU session establishment request may include the SM security service capability of the UE, the security service identifier may be the SM security service identifier, the target security service identifier is the UE SM security service identifier, the storage function entity is a UDM function entity or a PCF entity, and the second request message may include a subscription data request or a PDU-CAN session establishment request. The foregoing communication process is as follows:

After receiving the PDU session establishment request sent by the UE, the AMF entity sends an SM request to the SMF entity, where the SM request includes information carried in the PDU session establishment request. If the SMF entity sends the subscription data request to the UDM function entity, the SMF entity receives a subscription data response sent by the UDM function entity, to respond to the subscription data request, where the subscription data response may include the SM security service identifier. If the SMF entity sends the PDU-CAN session establishment request to the PCF entity, the SMF entity receives a PDU-CAN session establishment response sent by the PCF entity, to respond to the PDU-CAN session establishment request, where the PDU-CAN session establishment response includes the SM security service identifier.

After the SMF entity obtains the SM security service identifier and the SM security service capability of the UE, the SMF entity obtains the UE SM security service identifier based on the SM security service identifier and the SM security service capability of the UE.

Alternatively, the SMF entity obtains the UE SM security service identifier based on the SM security service identifier, the SM security service capability of the UE, and the SM security service capability of the SMF. The UE initiates the SM security service procedure indicated by the UE SM security service identifier, and completes the SM security service procedure with the SMF entity. Then, the SMF entity and the UE complete a subsequent PDU session establishment procedure.

Figure 4:
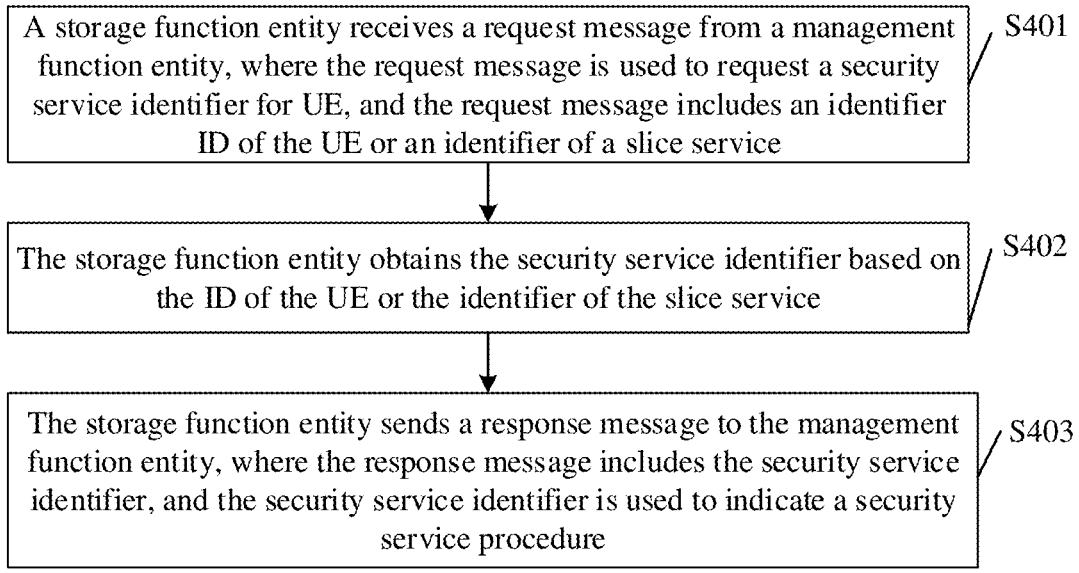
FIG. 4 is a schematic flowchart of another communication method according to an embodiment of the present disclosure.

FIG. 4 is a schematic flowchart of a communication method according to an embodiment of the present disclosure. As shown in FIG. 4, the method includes the following operations.

S401. A storage function entity receives a request message from a management function entity, where the request message is used to request a security service identifier for UE, and the request message includes an identifier ID of the UE or an identifier of a slice service.

The storage function entity may include a UDM function entity, a PCF entity, or an NRF entity.

The ID of the UE may be a permanent subscription identity of the UE. For example, the permanent subscription identity may be an IMSI, an SUPI, or another identity. The ID of the UE may alternatively be a temporary subscription identity of the UE. For example, the temporary subscription identity may be a globally unique temporary identity (GUTI), a temporary user identifier (Temporary User ID), or another identity.

The identifier of the slice service may be SM-NSSAI. Because NSSAI includes a plurality of pieces of SM- NSSAI, the identifier of the slice service may also be NSSAI. The identifier of the slice service may alternatively be a DNN. The identifier of the slice service may alternatively be a combination of NSSAI and a DNN. The identifier of the slice service may alternatively be a combination of the ID of the UE, NSSAI, and a DNN.

In one embodiment, the management function entity includes an AMF entity, the security service identifier includes an MM security service identifier, and the MM security service identifier is used to indicate an MM security service procedure.

Alternatively, the management function entity includes an AMF entity, the security service identifier includes an MM security service identifier and an SM security service identifier, and the SM security service identifier is used to indicate an SM security service procedure.

In one embodiment, the management function entity includes a session management function SMF entity, and the security service identifier includes an SM security service identifier.

It should be noted that for descriptions of the MM security service identifier, the MM security service procedure, the SM security service identifier, and the SM security service procedure, reference may be made to related descriptions of the foregoing operations or blocks S201 and S202. Details are not described herein again.

S402. The storage function entity obtains the security service identifier based on the ID of the UE or the identifier of the slice service.

For example, the storage function entity may search, based on the ID of the UE, a correspondence table that is between the ID of the UE and the MM security service identifier and that is pre-stored in the storage function entity, to obtain the MM security service identifier. The storage function entity may search, based on the ID of the UE, a correspondence table that is between the ID of the UE and the SM security service identifier and that is pre-stored in the storage function entity, to obtain the SM security service identifier.

In one embodiment, the storage function entity searches, based on the ID of the UE, a correspondence table between the ID of the UE and the MM security service identifier and a correspondence table between the ID of the UE and the SM security service identifier, to obtain the MM security service identifier and the SM security service identifier at one time, where the two correspondence tables are pre-stored in the storage function entity.

In an example, the storage function entity searches, based on the identifier of the slice service, a correspondence table that is between the identifier of the slice service and the MM security service identifier and that is pre-stored in the storage function entity, to obtain the MM security service identifier. The storage function entity searches, based on the identifier of the slice service, a correspondence table that is between the identifier of the slice service and the SM security service identifier and that is pre-stored in the storage function entity, to obtain the SM security service identifier.

In one embodiment, the storage function entity searches, based on the identifier of the slice service, a correspondence table between the identifier of the slice service and the MM security service identifier and a correspondence table between the identifier of the slice service and the SM security service identifier, to obtain the MM security service identifier and the SM security service identifier at one time, where the two correspondence tables are pre-stored in the storage function entity.

S403. The storage function entity sends a response message to the management function entity, where the response message includes the security service identifier, and the security service identifier is used to indicate a security service procedure.

In one embodiment, when the storage function entity includes the UDM function entity, the request message is an authentication data request, and the response message is an authentication data response; or the request message is a location update request, and the response message is a location update response.

Alternatively, when the storage function entity includes the PCF entity, the request message is a UE context establishment request, and the response message is a UE context establishment response.

In an example, the management function entity includes the AMF entity, the storage function entity includes the UDM function entity, the request message includes the authentication data request, the security service identifier includes the MM security service identifier, and the response message includes the authentication data response. After receiving the authentication data request sent by the AMF entity, the UDM function entity obtains the MM security service identifier, and sends the authentication data response to the AMF entity, where the authentication data response includes the MM security service identifier.

In an example, the management function entity includes the AMF entity, the storage function entity includes the UDM function entity, the request message includes the location update request, the security service identifier includes the MM security service identifier, and the response message includes the location update response. After receiving the location update request sent by the AMF entity, the UDM function entity obtains the MM security service identifier, and sends the location update response to the AMF entity, where the location update response includes the MM security service identifier.

In an example, the management function entity includes the AMF entity, the storage function entity is the PCF entity, the request message includes the UE context establishment request, the security service identifier includes the MM security service identifier, and the response message includes the UE context establishment response. After receiving the UE context establishment request sent by the AMF entity, the UDM function entity obtains the MM security service identifier, and sends the UE context establishment response to the AMF entity, where the UE context establishment response includes the MM security service identifier.

In an example, the management function entity includes the AMF entity, the storage function entity includes the UDM function entity, the request message includes the authentication data request, the security service identifier includes the MM security service identifier and the SM security service identifier, and the response message includes the authentication data response. After receiving the authentication data request sent by the AMF entity, the UDM function entity obtains the MM security service identifier, and sends the authentication data response to the AMF entity, where the authentication data response includes the MM security service identifier and the SM security service identifier.

In an example, the management function entity includes the AMF entity, the storage function entity includes the UDM function entity, the request message includes the location update request, the security service identifier includes the MM security service identifier and the SM security service identifier, and the response message includes the location update response. After receiving the location update request sent by the AMF entity, the UDM function entity obtains the MM security service identifier, and sends the location update response to the AMF entity, where the location update response includes the MM security service identifier and the SM security service identifier.

In an example, the management function entity includes the AMF entity, the storage function entity is the PCF entity, the request message includes the UE context establishment request, the security service identifier includes the MM security service identifier and the SM security service identifier, and the response message includes the UE context establishment response. After receiving the UE context establishment request sent by the AMF entity, the UDM function entity obtains the MM security service identifier, and sends the UE context establishment response to the AMF entity, where the UE context establishment response includes the MM security service identifier and the SM security service identifier.

In one embodiment, when the storage function entity includes the UDM function entity, the request message is a subscription data request, and the response message is a subscription data response.

Alternatively, when the storage function entity includes the PCF entity, the request message is a PDU-CAN session establishment request, and the response message is a PDU-CAN session establishment response.

In an example, the management function entity includes the SMF entity, the storage function entity is the UDM function entity, the request message includes the subscription data request, the security service identifier includes the SM security service identifier, and the response message includes the subscription data response. After receiving the subscription data request sent by the SMF entity, the UDM function entity obtains the SM security service identifier, and sends the subscription data response to the SMF entity, where the subscription data response includes the SM security service identifier.

In an example, the management function entity includes the SMF entity, the storage function entity is the PCF entity, the request message includes the PDU-CAN session establishment request, the security service identifier includes the SM security service identifier, and the response message includes the PDU-CAN session establishment response. After receiving the PDU-CAN session establishment request sent by the SMF entity, the PCF entity obtains the SM security service identifier, and sends the PDU-CAN session establishment response to the SMF entity, where the PDU-CAN session establishment response includes the SM security service identifier.

In an example, the management function entity includes the AMF entity, the storage function entity includes the NRF entity, and the security service identifier includes the MM security service identifier. After receiving the request message sent by the AMF entity, the NRF entity obtains the MM security service identifier, and sends the MM security service identifier to the AMF entity.

In an example, the management function entity includes the AMF entity, the storage function entity includes the NRF entity, and the security service identifier includes the MM security service identifier and the SM security service identifier. After receiving the request message sent by the AMF entity, the NRF entity obtains the MM security service identifier and the SM security service identifier, and sends the MM security service identifier and the SM security service identifier to the AMF entity.

In an example, the management function entity includes the SMF entity, the storage function entity includes the NRF entity, and the security service identifier includes the SM security service identifier. After receiving the request message sent by the SMF entity, the NRF entity obtains the SM security service identifier, and sends the SM security service identifier to the SMF entity.

Figure 5:
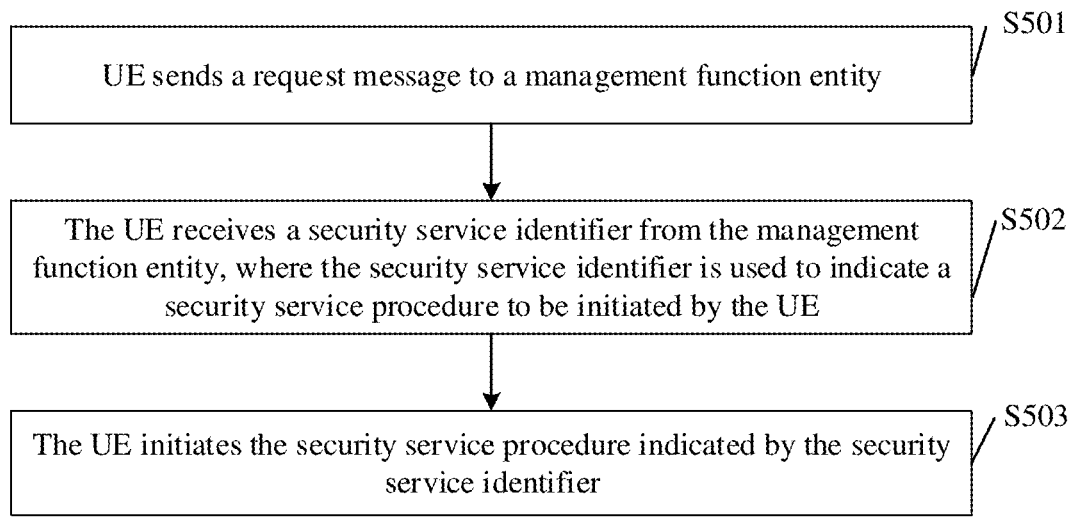
FIG. 5 is a schematic flowchart of another communication method according to an embodiment of the present disclosure.

FIG. 5 is a schematic flowchart of a communication method according to an embodiment of the present disclosure. As shown in FIG. 5, the method includes the following operations.

S501. UE sends a request message to a management function entity.

It should be noted that the request message may be the first request message in block S201. For block S501, refer to related descriptions of the foregoing block S201. Details are not described herein again.

S502. The UE receives a security service identifier from the management function entity, where the security service identifier is used to indicate a security service procedure to be initiated by the UE.

In one embodiment, the security service identifier includes a UE MM security service identifier or a UE SM security service identifier. The UE MM security service identifier indicates an MM security service procedure to be initiated by the UE, and the UE SM security service identifier indicates an SM security service procedure to be initiated by the UE.

It should be noted that for descriptions of the MM security service identifier, the MM security service procedure, the SM security service identifier, and the SM security service procedure, reference may be made to related descriptions of the foregoing blocks S201 and S202. Details are not described herein again.

S503. The UE initiates the security service procedure indicated by the security service identifier.

The security service procedure indicated by the security service identifier is initiated by the UE, and is performed between the UE and the management function entity.

In one embodiment, the management function entity includes an AMF entity or an SMF entity.

In a specific scenario, the management function entity includes the AMF entity, and the security service identifier includes the UE MM security service identifier. The UE initiates the MM security service procedure indicated by the UE MM security service identifier and completes the MM security service procedure with the AMF entity, and then the UE and the AMF entity complete a subsequent registration procedure.

In another specific scenario, the management function entity includes the SMF entity, and the security service identifier includes the UE SM security service identifier. The UE initiates the SM security service procedure indicated by the UE SM security service identifier and completes the SM security service procedure with the SMF entity, and then the UE and the SMF entity complete a subsequent PDU session establishment procedure.

It can be learned that in the solution in this embodiment of the present disclosure, the UE sends the request message to the management function entity to obtain a security service identifier that is required by the UE and that corresponds to the security service procedure, and initiates the security service procedure and completes the security service procedure with the management function entity, so that requirements of UE and a service for data security are met.

Figure 6:
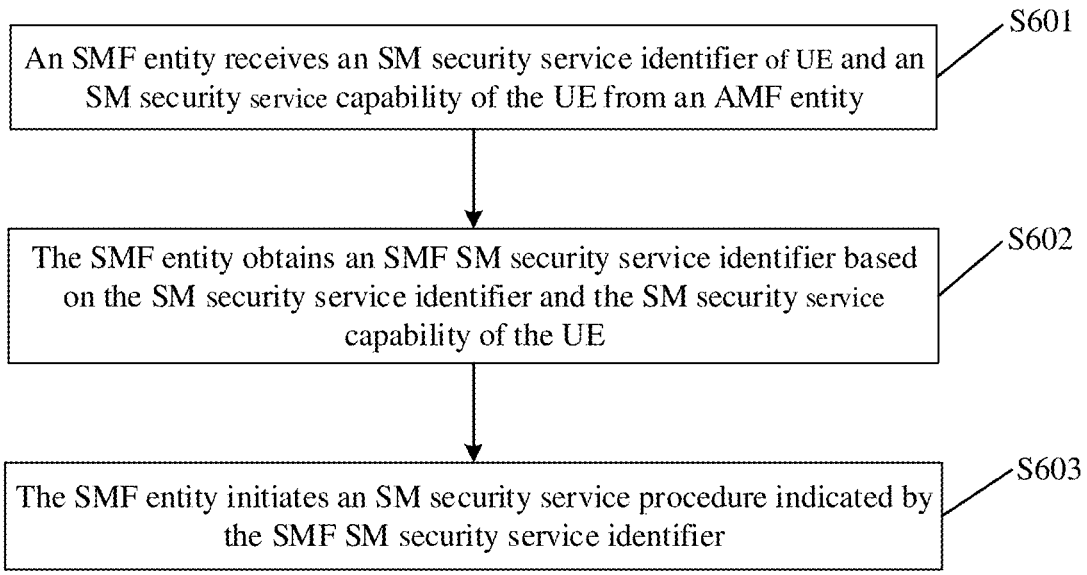
FIG. 6 is a schematic flowchart of another communication method according to an embodiment of the present disclosure.

FIG. 6 is a schematic flowchart of a communication method according to an embodiment of the present disclosure. As shown in FIG. 6, the method includes the following operations.

S601. An SMF entity receives an SM security service identifier of UE and an SM security service capability of the UE from an AMF entity.

The SM security service identifier is used to indicate an SM security service procedure, and the SM security service capability of the UE is used to indicate an SM security service procedure supported by the UE.

S602. The SMF entity obtains an SMF SM security service identifier based on the SM security service identifier and the SM security service capability of the UE.

The SMF SM security service identifier is used to indicate an SM security service procedure to be initiated by the SMF entity.

In one embodiment, that the SMF entity obtains an SMF SM security service identifier based on the SM security service identifier and the SM security service capability of the UE includes:

The SMF entity obtains the SMF SM security service identifier based on the SM security service identifier, the SM security service capability of the UE, and an SM security service capability of the SMF entity, where the SM security service capability of the SMF entity is used to indicate an SM security service procedure supported by the SMF entity, the SM security service procedure indicated by the SMF SM security service identifier is a security service procedure supported by both the UE and the SMF entity and initiated by the SMF entity, and the SM security service capability of the SMF is stored in the SMF entity.

S603. The SMF entity initiates the SM security service procedure indicated by the SMF SM security service identifier.

Specifically, the SMF initiates the security service procedure indicated by the SMF SM security service identifier, and completes the security service procedure with the UE. Then, the SMF and the UE complete a subsequent PDU session establishment procedure.

It can be learned that in the solution in this embodiment of the present disclosure, the SMF directly receives the SM security service identifier sent by the AMF, thereby reducing signaling interaction and improving efficiency of obtaining a security service procedure.

Figure 7:
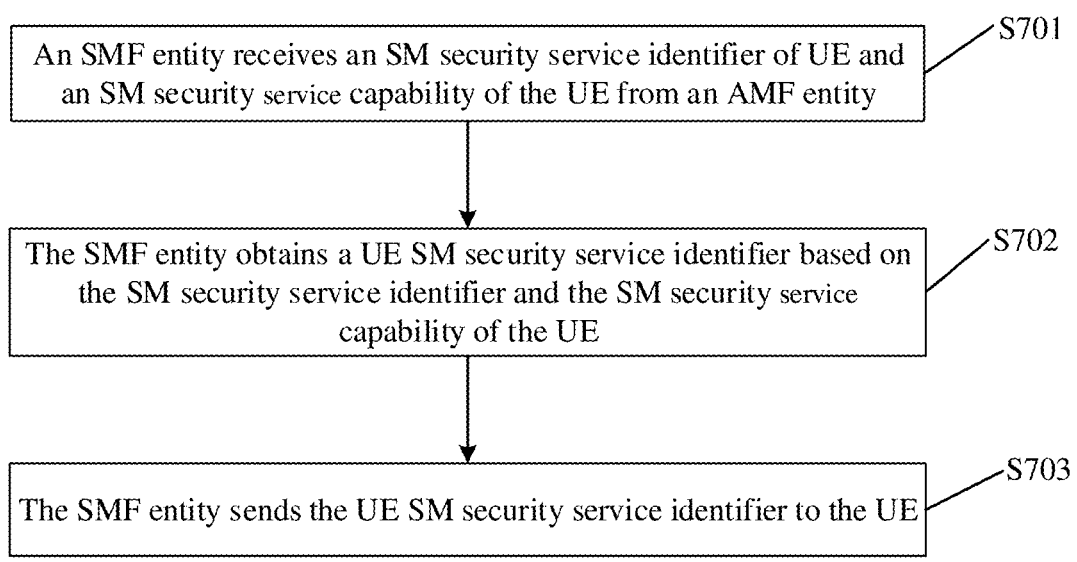
FIG. 7 is a schematic flowchart of another communication method according to an embodiment of the present disclosure.

FIG. 7 is a schematic flowchart of another communication method according to an embodiment of the present disclosure. As shown in FIG. 7, the method includes the following operations.

S701. An SMF entity receives an SM security service identifier of UE and an SM security service capability of the UE from an AMF entity.

The SM security service identifier is used to indicate an SM security service procedure, and the SM security service capability of the UE is used to indicate an SM security service procedure supported by the UE.

S702. The SMF entity obtains a UE SM security service identifier based on the SM security service identifier and the SM security service capability of the UE.

The UE SM security service identifier is used to indicate an SM security service procedure to be initiated by the UE.

In one embodiment, that the SMF entity obtains a UE SM security service identifier based on the SM security service identifier and the SM security service capability of the UE includes:

The SMF entity obtains the UE SM security service identifier based on the SM security service identifier, the SM security service capability of the UE, and an SM security service capability of the SMF entity, where the SM security service capability of the SMF entity is used to indicate an SM security service procedure supported by the SMF entity.

The SM security service procedure indicated by the UE SM security service identifier is a security service procedure supported by both the UE and the SMF entity and initiated by the UE, and the SM security service capability of the SMF is stored in the SMF entity.

S703. The SMF entity sends the UE SM security service identifier to the UE.

Specifically, after the UE receives the UE SM security service identifier, the UE initiates the SM security service procedure indicated by the UE SM security service identifier, and completes the SM security service procedure with the SMF entity. Then, the UE and the SMF entity complete a subsequent PDU session establishment procedure.

Figure 8:
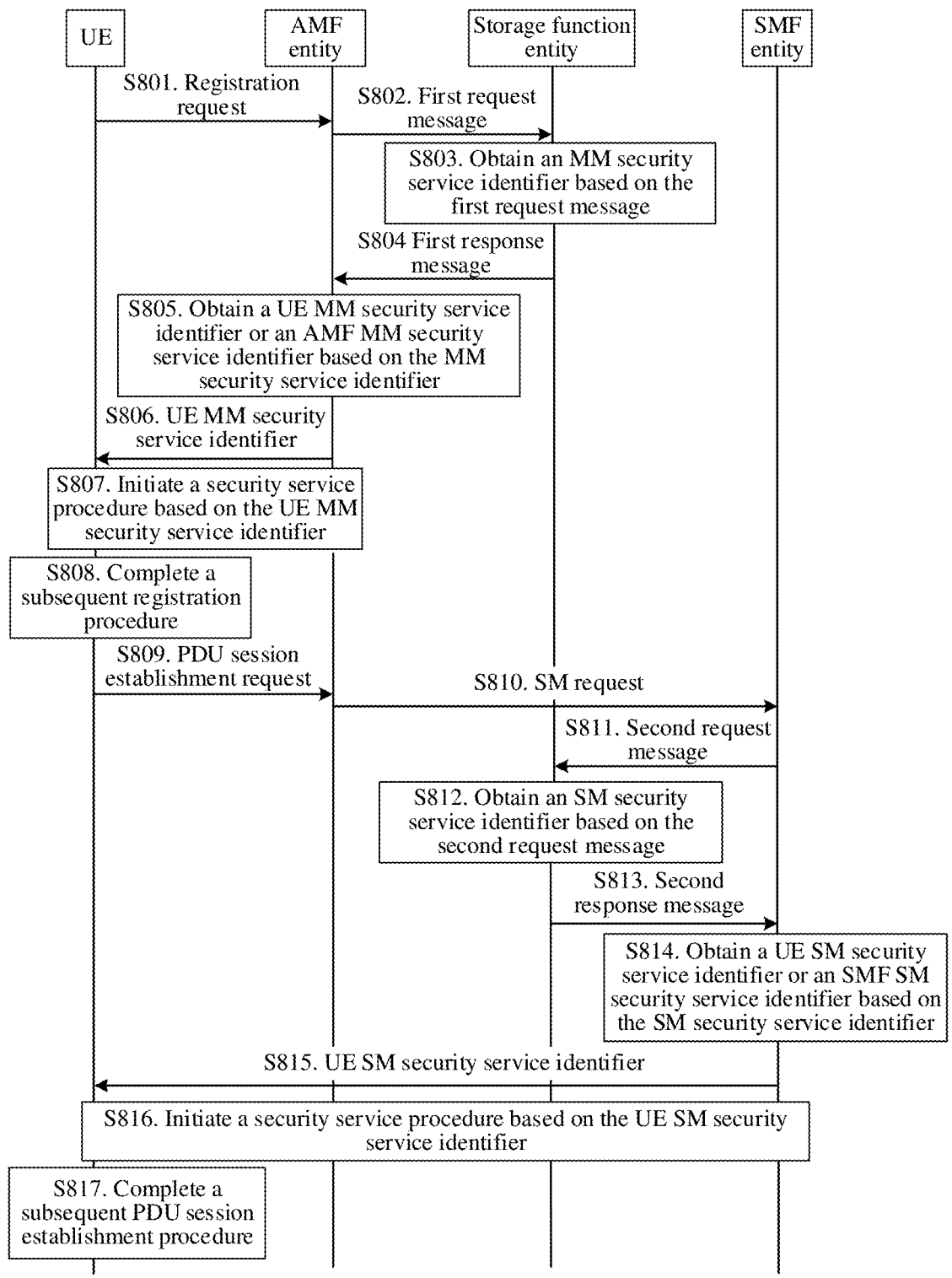
FIG. 8 is a schematic interaction flowchart of a communication method according to an embodiment of the present disclosure.

FIG. 8 is a schematic interaction flowchart of a communication method according to an embodiment of the present disclosure. As shown in FIG. 8, the method includes the following operations.

S801. UE sends a registration request to an AMF entity.

The registration request may include an ID of the UE, for example, a subscriber permanent identifier or a temporary user identifier, and may further include information such as network slice selection assistance information.

S802. After the AMF entity receives the registration request, the AMF entity sends a first request message to a storage function entity.

The first request message may be used to request an MM security service identifier for the UE, and the first request message may include the ID of the UE or an identifier of a slice service.

The MM security service identifier may be used to indicate a security service procedure between the UE and the AMF entity.

The first request message may be an authentication data request, a location update request, or a UE context establishment request.

Further, the authentication data request may include information such as the ID of the UE and the NSSAI. The location update request may include information such as the ID of the UE.

For the storage function entity, the ID of the UE, and the identifier of the slice service, refer to related descriptions of any one of the embodiments shown in FIG. 2 to FIG. 6. Details are not described again.

S803. The storage function entity obtains the MM security service identifier based on the first request message.

S804. The storage function entity sends a first response message to the AMF entity.

The first response message includes the MM security service identifier obtained in block S803.

Herein, it should be noted that for descriptions of blocks S802 to S804, reference may be made to related descriptions of the foregoing blocks S202, S302, S402, and S403. Details are not described herein again.

S805. The AMF entity obtains a UE MM security service identifier or an AMF MM security service identifier based on the MM security service identifier.

The UE MM security service identifier is used to indicate an MM security service procedure to be initiated by the UE. The AMF MM security service identifier is used to indicate an MM security service procedure to be initiated by the AMF entity.

In one embodiment, before the AMF entity obtains the UE MM security service identifier or the AMF MM security service identifier based on the MM security service identifier, the AMF entity determines whether the MM security service identifier indicates any security service procedure. If the MM security service identifier does not indicate any security service procedure, block S808 is performed. If the MM security service identifier indicates a security service procedure, the AMF entity determines whether the MM security service identifier includes the UE MM security service identifier. If the MM security service identifier includes the UE MM security service identifier, the AMF entity obtains the UE MM security service identifier and performs block S806. If the MM security service identifier does not include the UE MM security service identifier, the AMF entity uses the MM security service identifier as the AMF MM security service identifier and performs block S807'.

S806. The AMF entity sends the UE MM security service identifier to the UE.

In one embodiment, when there are a plurality of UE MM security service identifiers, the AMF entity may send the UE MM security service identifiers to the UE one by one, or may integrate the UE MM security service identifiers into one message and send the message to the UE.

For example, it is assumed that the security service procedure to be initiated by the UE includes a DH exchange procedure and a device authentication procedure. The AMF entity sends, to the UE, a security service identifier corresponding to the DH exchange procedure, and the UE initiates the DH exchange procedure and completes the DH exchange procedure with the AMF entity. Then, the AMF entity sends, to the UE, a security service identifier corresponding to the device authentication procedure, and the UE initiates the device authentication procedure and completes the device authentication procedure with the AMF entity.

S807. The UE initiates the security service procedure based on the UE MM security service identifier.

It should be noted that for block S807, reference may be made to related descriptions of the foregoing blocks S502 and S503. Details are not described herein again.

When the UE MM security service identifier is obtained in block S805, blocks S806 and S807 are performed.

Alternatively, when the AMF MM security service identifier is obtained in block S805, blocks S806 and S807 may be replaced with block S807'.

S807'. The AMF entity initiates the security service procedure based on the AMF MM security service identifier.

It should be noted that for descriptions of block S807', reference may be made to related descriptions of the foregoing block S205. Details are not described herein again.

It should be noted that the foregoing security service procedures are performed between the UE and the AMF entity. Initiating a security service procedure may be sending a first piece of signaling in the security service procedure, or triggering to send a first piece of signaling in the security service procedure.

For example, if the AMF MM security service identifier represents the DH exchange procedure and the UE MM security service identifier represents the device authentication procedure, the AMF entity initiates the DH exchange procedure and completes the DH exchange procedure with the UE, and then the UE initiates the device authentication procedure and completes the device authentication procedure with the AMF entity.

S808. The UE completes a subsequent registration procedure.

Specifically, the UE and the AMF entity complete the subsequent registration procedure.

So far, the UE completes network registration. In one embodiment, after the foregoing operations are completed, the UE performs a PDU session establishment procedure. The PDU session establishment procedure is as follows:

S809. The UE sends a PDU session establishment request to the AMF entity.

The PDU session establishment request may include at least one of SM-NSSAI, a DNN, a PDU session identifier, and SM information.

S810. The AMF entity sends an SM request to an SMF entity, where the SM request includes the PDU session establishment request.

S811. After receiving the SM request, the SMF entity sends a second request message to the storage function entity.

The second request message may be used to request an SM security service identifier for the UE.

The SM security service identifier is used to indicate a security service procedure between UE and an SMF.

S812. The storage function entity obtains the SM security service identifier based on the second request message.

The second request message may include the ID of the UE or the identifier of the slice service.

Further, the storage function entity may obtain the SM security service identifier based on the identifier of the slice service or the ID of the UE.

S813. The storage function entity sends a second response message to the SMF entity.

The second response message includes the SM security service identifier obtained in block S812.

It should be noted that for descriptions of blocks S811 to S813, reference may be made to related descriptions of the foregoing blocks S202, S302, S402, S403, S502, and S503. Details are not described herein again.

S814. The SMF entity obtains a UE SM security service identifier or an SMF SM security service identifier based on the SM security service identifier.

The UE SM security service identifier is used to indicate an SM security service procedure to be initiated by the UE, and the SMF SM security service identifier is used to indicate an SM security service procedure to be initiated by the SMF entity.

In one embodiment, before the SMF entity obtains the UE SM security service identifier or the SMF SM security service identifier based on the SM security service identifier, the SMF entity determines whether the SM security service identifier indicates any security service procedure. If the SM security service identifier does not indicate a security service procedure, block S817 is performed. If the SM security service identifier indicates a security service procedure, the SMF entity determines whether the SM security service identifier includes the UE SM security service identifier. If the SM security service identifier includes the UE SM security service identifier, the SMF entity obtains the UE SM security service identifier and performs block S815. If the SM security service identifier does not include the UE SM security service identifier, the SMF entity uses the SM security service identifier as the SMF SM security service identifier and performs block S816'.

S815. The SMF entity sends the UE SM security service identifier to the UE.

There may be one or more UE SM security service identifiers.

In one embodiment, the SMF entity sends a set of the UE SM security service identifiers to the UE.

In one embodiment, the SMF entity sends the UE SM security service identifiers to the UE one by one.

For example, it is assumed that the security service procedure to be initiated by the UE includes a secondary authentication procedure and a user authentication procedure. The SMF entity sends, to the UE, a security service identifier corresponding to the secondary authentication procedure, and the UE initiates the secondary authentication procedure and completes the secondary authentication procedure with the SMF entity. Then, the SMF entity sends, to the UE, a security service identifier corresponding to the user authentication procedure, and the UE initiates the user authentication procedure and completes the user authentication procedure with the SMF entity.

S816. The UE initiates the security service procedure based on the UE SM security service identifier.

It should be noted that for block S816, reference may be made to related descriptions of the foregoing blocks S502 and S503. Details are not described herein again.

When the UE SM security service identifier is obtained in block S814, blocks S815 and S816 are performed.

Alternatively, when the SMF SM security service identifier is obtained in block S814, blocks S815 and S816 may be replaced with block S816'.

S816'. The SMF entity initiates the security service procedure based on the SMF SM security service identifier.

It should be noted that for descriptions of block S816', reference may be made to related descriptions of the foregoing block S205. Details are not described herein again.

It should be noted that the foregoing SM security service procedures are performed between the UE and the SMF entity.

For example, if the SMF SM security service identifier represents the user authentication procedure and the UE SM security service identifier represents the secondary authentication procedure, the SMF entity may initiate the user authentication procedure and complete the user authentication procedure with the UE, and then the UE initiates the secondary authentication procedure and completes the secondary authentication procedure with the SMF entity.

S817. The UE completes a subsequent PDU session establishment procedure.

Specifically, the UE and the SMF entity complete the subsequent PDU session establishment procedure.

It should be noted that for descriptions of the MM security service identifier, the MM security service procedure, the SM security service identifier, and the SM security service procedure, reference may be made to related descriptions of the foregoing blocks S201 and S202. Details are not described herein again.

Figure 9:
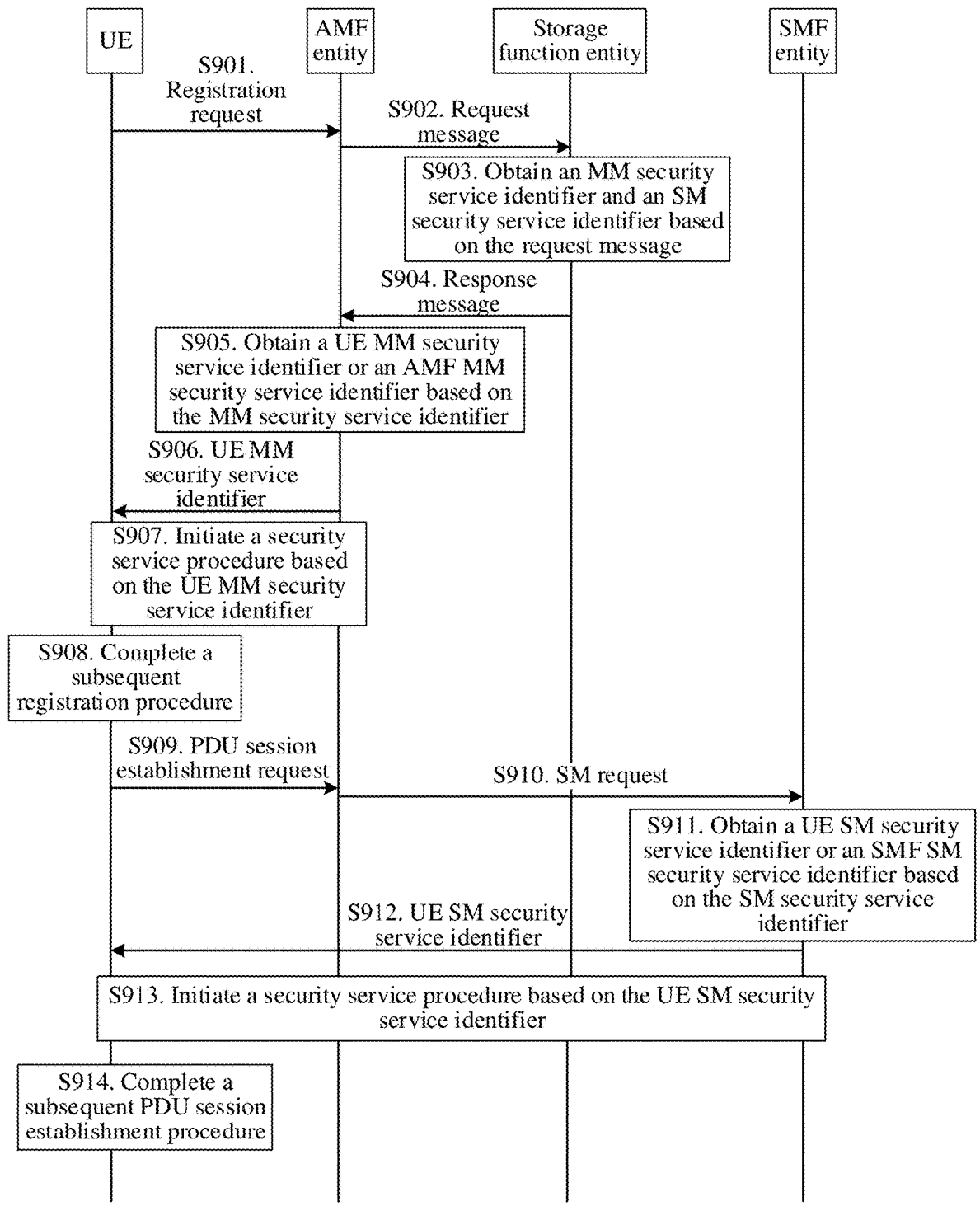
FIG. 9 is a schematic interaction flowchart of another communication method according to an embodiment of the present disclosure.

FIG. 9 is a schematic interaction flowchart of another communication method according to an embodiment of the present disclosure. As shown in FIG. 9, the method includes the following operations.

S901. UE sends a registration request to an AMF entity.

The registration request message may include an ID of the UE, for example, a subscriber permanent identifier or a temporary user identifier, and may further include information such as NSSAI.

S902. After the AMF entity receives the registration request, the AMF entity sends a request message to a storage function entity.

The request message is used to request a security service identifier for the UE. The request message may include the ID of the UE or an identifier of a slice service.

The security service identifier may include an MM security service identifier and an SM security service identifier.

The MM security service identifier is used to indicate a security service procedure between UE and an AMF entity.

The SM security service identifier is used to indicate a security service procedure between UE and an SMF entity.

The request message may be an authentication data request, a location update request, or a UE context establishment request.

Further, the authentication data request may include information such as the ID of the UE and the NSSAI. The location update request may include information such as the ID of the UE.

For the storage function entity, the ID of the UE, and the identifier of the slice service, refer to related descriptions of any one of the embodiments shown in FIG. 2 to FIG. 6. Details are not described again.

S903. The storage function entity obtains the MM security service identifier and the SM security service identifier based on the request message.

The request message may include the ID of the UE or the identifier of the slice service.

In one embodiment, the storage function entity may search, based on the ID of the UE, a correspondence table that is between the ID of the UE and each of the MM security service identifier and the SM security service identifier and that is pre-stored in the storage function entity, to obtain the MM security service identifier and the SM security service identifier at one time.

In one embodiment, the storage function entity searches, based on the identifier of the slice service, a correspondence table that is between the identifier of the slice service and each of the MM security service identifier and the SM security service identifier and that is pre-stored in the storage function entity, to obtain the MM security service identifier and the SM security service identifier at one time.

S904. The storage function entity sends a response message to the AMF entity, to respond to the request message.

The response message includes the MM security service identifier and the SM security service identifier that are obtained in block S903.

Herein, it should be noted that for blocks S902 to S904, reference may be made to related descriptions of the foregoing blocks S202, S302, S402, and S403. Details are not described herein again.

S905. The AMF entity obtains a UE MM security service identifier or an AMF MM security service identifier based on the MM security service identifier.

In one embodiment, the AMF entity stores the SM security service identifier.

In one embodiment, the AMF entity obtains a UE SM security service identifier from the SM security service identifier, and sends the UE SM security service identifier to the UE. The UE SM security service identifier is used to indicate an SM security service procedure to be initiated by the UE.

Further, the AMF entity determines whether the SM security service identifier indicates a security service procedure. If the SM security service identifier does not indicate any security service procedure, after block S908 is performed, a normal PDU session establishment procedure is directly performed.

S906. The AMF entity sends the UE MM security service identifier to the UE.

S907. The UE initiates a security service procedure based on the UE MM security service identifier.

When the UE MM security service identifier is obtained in block S905, blocks S906 and S907 are performed.

Alternatively, when the AMF MM security service identifier is obtained in block S905, blocks S906 and S907 may be replaced with block S907'.

S907'. The AMF entity initiates a security service procedure based on the AMF MM security service identifier.

Herein, it should be noted that for blocks S905 to S907', reference may be made to related descriptions of the foregoing blocks S805 to S807'. Details are not described herein again.

S908. The UE completes a subsequent registration procedure.

Specifically, the UE and the AMF entity complete the subsequent registration procedure.

So far, the UE completes network registration. In one embodiment, after the foregoing operations are completed, the UE performs a PDU session establishment procedure. The PDU session establishment procedure is as follows:

S909. The UE sends a PDU session establishment request to the AMF entity.

The PDU session establishment request may include at least one of SM-NSSAI, a DNN, a PDU session identifier, and SM information.

After receiving the PDU session establishment request, the AMF entity selects an SMF entity based on information included in the PDU session establishment request.

S910. After the AMF entity receives the PDU session establishment request, the AMF entity sends an SM request to the SMF entity.

The SM request includes the PDU session establishment request. The SM request may further include the ID of the UE.

In one embodiment, the SM request includes the SM security service identifier stored in the AMF entity.

S911. The SMF entity obtains the UE SM security service identifier or an SMF SM security service identifier based on the SM security service identifier.

S912. The SMF entity sends the UE SM security service identifier to the UE.

It should be noted that for descriptions of blocks S910 to S912, reference may be made to related descriptions of the foregoing blocks S601, S602, and S701 to S703. Details are not described herein again.

S913. The UE initiates the security service procedure based on the UE SM security service identifier.

When the UE SM security service identifier is obtained in block S911, blocks S912 and S913 are performed.

Alternatively, when the SMF SM security service identifier is obtained in block S911, blocks S912 and S913 may be replaced with block S913'.

S913'. The SMF entity initiates a security service procedure based on the SMF SM security service identifier.

Herein, it should be noted that for blocks S913 and S913', reference may be made to related descriptions of the foregoing blocks S816 and S816'. Details are not described herein again.

S914. The UE completes a subsequent PDU session establishment procedure.

Specifically, the UE and the SMF entity complete the subsequent PDU session establishment procedure.

It should be noted that for descriptions of the MM security service identifier, the MM security service procedure, the SM security service identifier, and the SM security service procedure, reference may be made to related descriptions of the foregoing blocks S201 and S202. Details are not described herein again.

It can be learned that in the solution in this embodiment of the present disclosure, in a network registration process, the AMF entity queries the storage function entity once by using the ID of the UE or the identifier of the slice service, to obtain the MM security service identifier and the SM security service identifier that are required by the UE or the slice service. The UE and a management function entity initiate corresponding security service procedures in a registration process and a PDU session establishment process. In this way, not only requirements of a user and a service for data security are met, but also signaling interaction is reduced.

Figure 10:
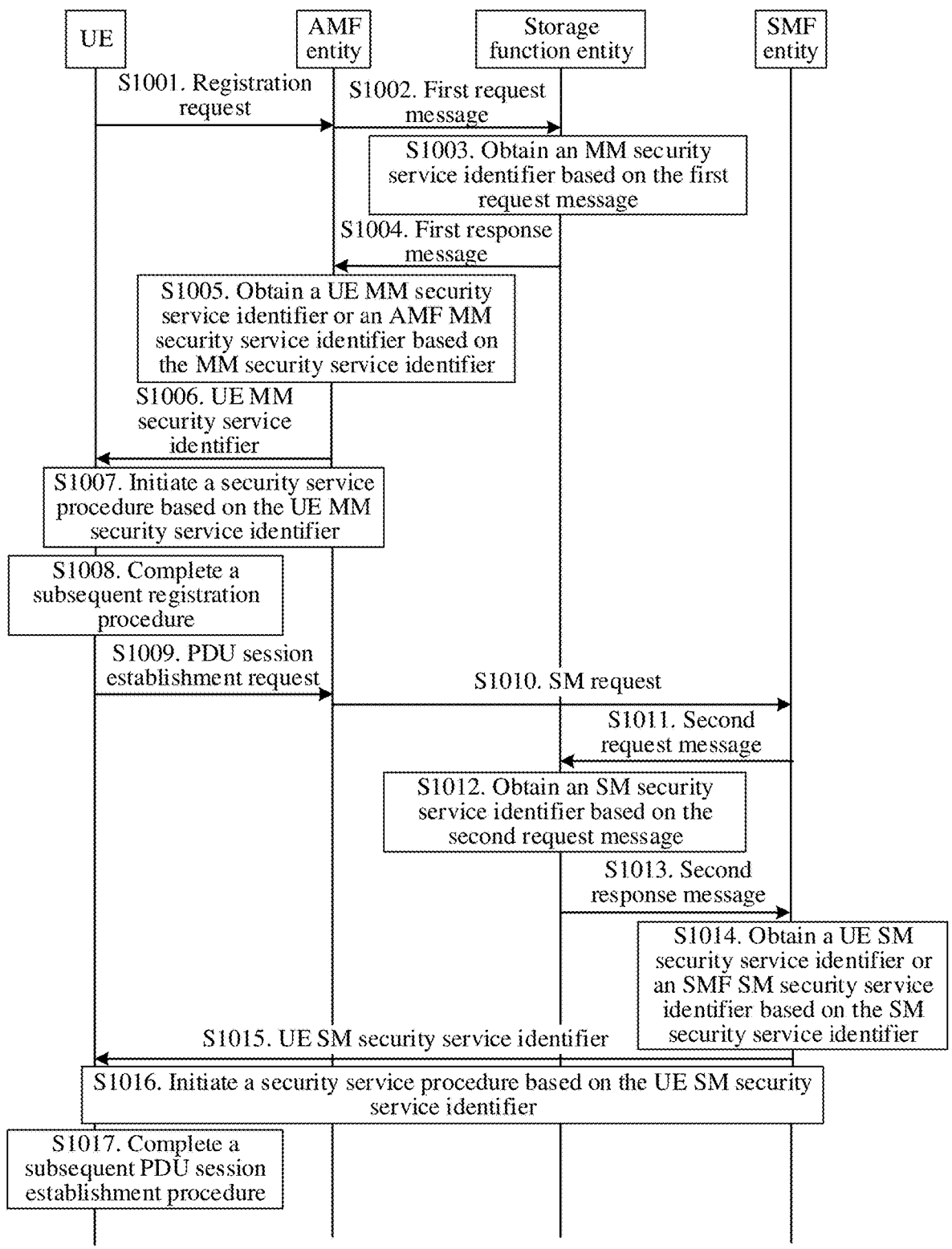
FIG. 10 is a schematic interaction flowchart of another communication method according to an embodiment of the present disclosure.

FIG. 10 is a schematic interaction flowchart of another communication method according to an embodiment of the present disclosure. As shown in FIG. 10, the method includes the following operations.

S1001. UE sends a registration request to an AMF entity, to request to register with a network.

The registration request includes an ID of the UE, for example, a subscriber permanent identifier or a temporary user identifier, and may further include at least one of network slice selection assistance information and an MM security service capability of the UE. The MM security service capability of the UE is used to indicate an MM security service procedure supported by the UE.

S1002. After the AMF entity receives the registration request, the AMF entity sends a first request message to a storage function entity.

The first request message may be used to request an MM security service identifier for the UE, and the first request message may include the ID of the UE or an identifier of a slice service.

The MM security service identifier may be used to indicate a security service procedure between the UE and the AMF entity.

The first request message may include an authentication data request, a location update request, or a UE context establishment request.

Further, the authentication data request may include information such as the ID of the UE and the NSSAI. The location update request may include information such as the ID of the UE.

For the storage function entity, the ID of the UE, and the identifier of the slice service, refer to related descriptions of any one of the embodiments shown in FIG. 2 to FIG. 6. Details are not described again.

S1003. The storage function entity obtains the MM security service identifier based on the first request message.

S1004. The storage function entity sends a first response message to the AMF entity, to respond to the first request message.

The first response message includes the MM security service identifier obtained in block S1003.

It should be noted that for processes of blocks S1002 to S1004, reference may be made to related descriptions of the foregoing blocks S202, S302, S402, and S403. Details are not described herein again.

S1005. The AMF entity obtains a UE MM security service identifier or an AMF MM security service identifier based on the MM security service identifier.

In one embodiment, before the AMF entity obtains the UE MM security service identifier or the AMF MM security service identifier based on the MM security service identifier, the AMF entity determines whether the MM security service identifier indicates any security service procedure. If the MM security service identifier does not indicate any security service procedure, block S1008 is performed. If the MM security service identifier indicates a security service procedure, the AMF entity determines whether the MM security service identifier includes the UE MM security service identifier. If the MM security service identifier includes the UE MM security service identifier, the AMF entity obtains the UE MM security service identifier based on the MM security service identifier, and performs block S1006. If the MM security service identifier does not include the UE MM security service identifier, the AMF entity uses the MM security service identifier as the AMF MM security service identifier, and performs block S1007'.

That the AMF entity obtains a UE MM security service identifier or an AMF MM security service identifier based on the MM security service identifier includes:

The AMF entity obtains the UE MM security service identifier or the AMF MM security service identifier based on the MM security service identifier and the MM security service capability of the UE, where the UE MM security service identifier is used to indicate an MM security service procedure to be initiated by the UE, and the AMF MM security service identifier is used to indicate an MM security service procedure to be initiated by the AMF entity.

In one embodiment, that the AMF entity obtains a UE MM security service identifier or an AMF MM security service identifier based on the MM security service identifier further includes:

The AMF entity obtains the UE MM security service identifier or the AMF MM security service identifier based on the MM security service identifier, the MM security service capability of the UE, and an MM security service capability of the AMF, where the UE MM security service identifier is used to indicate an MM security service procedure supported by both the UE and the AMF entity and initiated by the UE, and the AMF MM security service identifier is used to indicate an MM security service procedure supported by both the UE and the AMF entity and initiated by the AMF entity. The MM security service capability of the AMF entity is used to indicate an MM security service procedure supported by the AMF entity.

S1006. The AMF entity sends the UE MM security service identifier to the UE.

S1007. The UE initiates the security service procedure based on the UE MM security service identifier.

When the UE MM security service identifier is obtained in block S1005, blocks S1006 and S1007 are performed.

Alternatively, when the AMF MM security service identifier is obtained in block S1005, blocks S1006 and S1007 may be replaced with block S1007'.

S1007'. The AMF entity initiates the security service procedure based on the AMF MM security service identifier.

Herein, it should be noted that for descriptions of blocks S1006 to S1007', reference may be made to related descriptions of the foregoing blocks S806 to S807'. Details are not described herein again.

S1008. The UE completes a subsequent registration procedure.

Specifically, the UE and the AMF entity complete the subsequent registration procedure.

So far, the UE completes network registration. In one embodiment, after the foregoing operations are completed, the UE performs a PDU session establishment procedure. The PDU session establishment procedure is as follows:

S1009. The UE sends a PDU session establishment request to the AMF entity.

The PDU session establishment request may include at least one of SM-NSSAI, a DNN, a PDU session identifier, SM information, and an SM security service capability of the UE.

The SM security service capability of the UE represents an SM security service procedure supported by the UE.

S1010. The AMF entity sends an SM request to an SMF entity, where the SM request includes the PDU session establishment request.

The SM request may further include the ID of the UE.

S1011. After receiving the SM request, the SMF entity sends a second request message to the storage function entity.

The second request message may be used to request an SM security service identifier for the UE.

The SM security service identifier is used to indicate a security service procedure between UE and an SMF.

The second request message may include a subscription data request or a PDU-CAN session establishment request.

S1012. The storage function entity obtains the SM security service identifier based on the second request message.

The second request message may include the ID of the UE or the identifier of the slice service.

Further, the storage function entity may obtain the SM security service identifier based on the identifier of the slice service or the ID of the UE.

S1013. The storage function entity sends a second response message to the SMF entity, to respond to the second request message.

The second response message includes the SM security service identifier obtained in block S1012.

It should be noted that for processes of blocks S1011 to S1013, reference may be made to related descriptions of the foregoing blocks S202, S302, S402, and S403. Details are not described herein again.

S1014. The SMF entity obtains a UE SM security service identifier or an SMF SM security service identifier based on the SM security service identifier.

In one embodiment, before the SMF entity obtains the UE SM security service identifier or the SMF SM security service identifier based on the SM security service identifier, the SMF entity determines whether the SM security service identifier indicates any security service procedure. If the SM security service identifier does not indicate any security service procedure, block S1017 is performed. If the SM security service identifier indicates a security service procedure, the SMF entity determines whether the SM security service identifier includes the UE SM security service identifier. If the SM security service identifier includes the UE SM security service identifier, the SMF entity obtains the UE SM security service identifier based on the SM security service identifier, and performs block S1015. If the SM security service identifier does not include the UE SM security service identifier, the SMF entity uses the SM security service identifier as the SMF SM security service identifier, and performs block S1016'.

That the SMF entity obtains a UE SM security service identifier or an SMF SM security service identifier based on the SM security service identifier includes:

The SMF entity obtains the UE SM security service identifier or the SMF SM security service identifier based on the SM security service identifier and the SM security service capability of the UE, where the UE SM security service identifier is used to indicate an SM security service procedure to be initiated by the UE, and the SMF SM security service identifier is used to indicate an SM security service procedure to be initiated by the SMF entity.

In one embodiment, that the SMF entity obtains a UE SM security service identifier or an SMF SM security service identifier based on the SM security service identifier further includes:

The SMF entity obtains the UE SM security service identifier or the SMF SM security service identifier based on the SM security service identifier, the SM security service capability of the UE, and an SM security service capability of the SMF, where the UE SM security service identifier is used to indicate an SM security service procedure supported by both the UE and the SMF entity and initiated by the UE, and the SMF SM security service identifier is used to indicate an SM security service procedure supported by both the UE and the SMF entity and initiated by the SMF entity. The SM security service capability of the SMF is used to indicate an SM security service procedure supported by the SMF entity.

S1015. The SMF entity sends the UE SM security service identifier to the UE.

S1016. The UE initiates the security service procedure based on the UE SM security service identifier.

When the UE SM security service identifier is obtained in block S1014, blocks S1015 and S1016 are performed.

Alternatively, when the SMF SM security service identifier is obtained in block S1014, blocks S1015 and S1016 may be replaced with block S1016'.

S1016'. The SMF entity initiates the security service procedure based on the SMF SM security service identifier.

Herein, it should be noted that for descriptions of blocks S1015 to S1016', reference may be made to related descriptions of the foregoing blocks S815 to S816'. Details are not described herein again.

S1017. The UE completes a subsequent PDU session establishment procedure.

Specifically, the UE and the SMF entity complete the subsequent PDU session establishment procedure.

It should be noted that for descriptions of the MM security service identifier, the MM security service procedure, the SM security service identifier, and the SM security service procedure, reference may be made to related descriptions of the foregoing blocks S201 and S202. Details are not described herein again.

It can be learned that in the solution in this embodiment of the present disclosure, a management function entity first obtains, by using the ID of the UE or the identifier of the slice service, a security service identifier required by the UE or the slice service. Then, the management function entity obtains, based on the MM security service capability of the UE and the MM security service capability of the AMF entity, the MM security service procedure supported by both the UE and the AMF entity, and obtains, based on the SM security service capability of the UE and the SM security service capability of the SMF entity, the SM security service procedure supported by both the UE and the SMF entity. Finally, the UE and the management function entity initiate corresponding security service procedures. In comparison with the prior art, not only requirements of a user and a service for data security are met, but also a security service is obtained through negotiation by introducing a security service capability.

Figure 11:
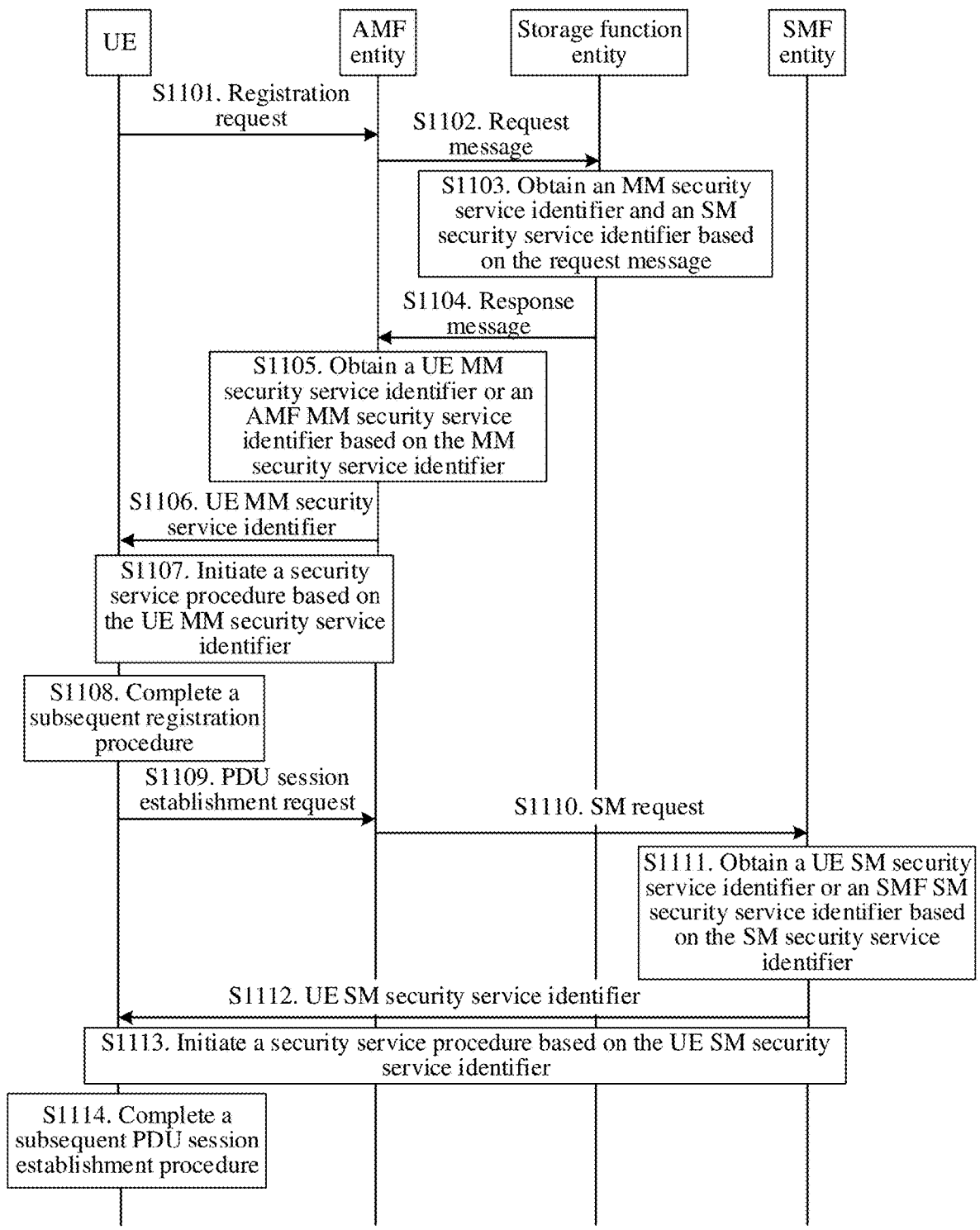
FIG. 11 is a schematic interaction flowchart of another communication method according to an embodiment of the present disclosure.

FIG. 11 is a schematic interaction flowchart of another communication method according to an embodiment of the present disclosure. As shown in FIG. 11, the method includes the following operations.

S1101. UE sends a registration request to an AMF entity.

The registration request may include a subscriber permanent identifier or a temporary user identifier, and may further include at least one of network slice selection assistance information, an MM security service capability of the UE, and an SM security service capability of the UE. The MM security service capability of the UE is used to indicate an MM security service procedure supported by the UE. The SM security service capability of the UE is used to indicate an SM security service procedure supported by the UE.

S1102. After the AMF entity receives the registration request, the AMF entity sends a request message to a storage function entity.

The request message is used to request a security service identifier for the UE. The request message may include an ID of the UE or an identifier of a slice service.

The security service identifier includes an MM security service identifier and an SM security service identifier.

The MM security service identifier is used to indicate a security service procedure performed between the UE and the AMF entity. The SM security service identifier is used to indicate a security service procedure between UE and an SMF entity.

The request message may be an authentication data request, a location update request, or a UE context establishment request.

Further, the authentication data request may include information such as the ID of the UE and the NSSAI. The location update request may include information such as the ID of the UE.

For the storage function entity, the ID of the UE, and the identifier of the slice service, refer to related descriptions of any one of the embodiments shown in FIG. 2 to FIG. 6. Details are not described again.

In one embodiment, the AMF entity stores the SM security service capability of the UE.

S1103. The storage function entity obtains the MM security service identifier and the SM security service identifier based on the request message.

The request message may include the ID of the UE or the identifier of the slice service.

In one embodiment, the storage function entity may search, based on the ID of the UE, a correspondence table that is between the ID of the UE and each of the MM security service identifier and the SM security service identifier and that is pre-stored in the storage function entity, to obtain the MM security service identifier and the SM security service identifier at one time.

In one embodiment, the storage function entity searches, based on the identifier of the slice service, a correspondence table that is between the identifier of the slice service and each of the MM security service identifier and the SM security service identifier and that is pre-stored in the storage function entity, to obtain the MM security service identifier and the SM security service identifier at one time.

S1104. The storage function entity sends a response message to the AMF entity, to respond to the request message.

The response message includes the MM security service identifier and the SM security service identifier that are obtained in block S1103.

Herein, it should be noted that for blocks S1102 to S1104, reference may be made to related descriptions of the foregoing blocks S202, S302, S402, and S403. Details are not described herein again.

S1105. The AMF entity obtains a UE MM security service identifier or an AMF MM security service identifier based on the MM security service identifier.

That the AMF entity obtains a UE MM security service identifier or an AMF MM security service identifier based on the MM security service identifier includes:

The AMF entity obtains the UE MM security service identifier or the AMF MM security service identifier based on the MM security service identifier and the MM security service capability of the UE, where the UE MM security service identifier is used to indicate an MM security service procedure to be initiated by the UE, and the AMF MM security service identifier is used to indicate an MM security service procedure to be initiated by the AMF entity.

In one embodiment, that the AMF entity obtains a UE MM security service identifier or an AMF MM security service identifier based on the MM security service identifier further includes:

The AMF entity obtains the UE MM security service identifier or the AMF MM security service identifier based on the MM security service identifier, the MM security service capability of the UE, and an MM security service capability of the AMF, where the UE MM security service identifier is used to indicate an MM security service procedure supported by both the UE and the AMF entity and initiated by the UE, and the AMF MM security service identifier is used to indicate an MM security service procedure supported by both the UE and the AMF entity and initiated by the AMF entity. The MM security service capability of the AMF entity is used to indicate an MM security service procedure supported by the AMF entity.

In one embodiment, the AMF entity stores the SM security service identifier.

In one embodiment, the AMF entity obtains a UE SM security service identifier from the SM security service identifier based on the SM security service capability of the UE, and the UE SM security service identifier is used to indicate an SM security service procedure supported by UE.

Further, the AMF entity determines whether the SM security service identifier indicates any security service procedure. If the SM security service identifier does not indicate any SM security service procedure, after block S1108 is performed, a normal PDU session establishment procedure is directly performed.

S1106. The AMF entity sends the UE MM security service identifier to the UE.

S1107. The UE initiates the security service procedure based on the UE MM security service identifier.

When the UE MM security service identifier is obtained in block S1105, blocks S1106 and S1107 are performed.

Alternatively, when the AMF MM security service identifier is obtained in block S1105, blocks S1106 and S1107 may be replaced with block S1107'.

S1107'. The AMF entity initiates the security service procedure based on the AMF MM security service identifier.

Herein, it should be noted that for blocks S1105 to S1107', reference may be made to related descriptions of the foregoing blocks S905 to S907'. Details are not described herein again.

S1108. The UE completes a subsequent registration procedure.

So far, the UE completes network registration. In one embodiment, after the foregoing operations are completed, the UE performs a PDU session establishment procedure. The PDU session establishment procedure is as follows:

S1109. The UE sends a PDU session establishment request to the AMF entity.

The PDU session establishment request may include at least one of SM-NSSAI, a DNN, a PDU session identifier, SM information, and an SM security service capability of the UE.

After receiving the PDU session establishment request, the AMF entity selects an SMF entity based on information included in the PDU session establishment request.

In one embodiment, the AMF entity selects the SMF entity based on the SM security service identifier stored in the AMF entity.

Specifically, the AMF entity selects, based on the SM security service identifier, the SMF entity that supports the indicated SM security service procedure.

S1110. After the AMF entity receives the PDU session establishment request, the AMF entity sends an SM request to the SMF entity.

The SM request includes the PDU session establishment request. The SM request may further include the ID of the UE.

In one embodiment, the SM request includes information such as the SM security service identifier stored in the AMF entity and the SM security service capability of the UE.

S1111. The SMF entity obtains the UE SM security service identifier or an SMF SM security service identifier based on the SM security service identifier.

That the SMF entity obtains a UE SM security service identifier or an SMF SM security service identifier based on the SM security service identifier may include:

The SMF entity obtains the UE SM security service identifier or the SMF SM security service identifier based on the SM security service identifier and the SM security service capability of the UE, where the UE SM security service identifier is used to indicate an SM security service procedure to be initiated by the UE, and the SMF SM security service identifier is used to indicate an SM security service procedure to be initiated by the SMF entity.

In one embodiment, that the SMF entity obtains a UE SM security service identifier or an SMF SM security service identifier based on the SM security service identifier further includes:

The SMF entity obtains the UE SM security service identifier or the SMF SM security service identifier based on the SM security service identifier, the SM security service capability of the UE, and an SM security service capability of the SMF, where the UE SM security service identifier is used to indicate an SM security service procedure supported by both the UE and the SMF entity and initiated by the UE, and the SMF SM security service identifier is used to indicate an SM security service procedure supported by both the UE and the SMF entity and initiated by the SMF entity. The SM security service capability of the SMF is used to indicate an SM security service procedure supported by the SMF entity.

S1112. The SMF entity sends the UE SM security service identifier to the UE.

S1113. The UE initiates the security service procedure based on the UE SM security service identifier.

When the UE SM security service identifier is obtained in block S1111, blocks S1112 and S1113 are performed.

Alternatively, when the SMF SM security service identifier is obtained in block S1111, blocks S1112 and S1113 may be replaced with block S1113'.

S1113'. The SMF entity initiates the security service procedure based on the SMF SM security service identifier.

Herein, it should be noted that for blocks S1111 to S1113', reference may be made to related descriptions of the foregoing blocks S911 to S913'. Details are not described herein again.

S1114. The UE completes a subsequent PDU session establishment procedure.

Specifically, the UE and the SMF entity complete the subsequent PDU session establishment procedure.

It should be noted that for descriptions of the MM security service identifier, the MM security service procedure, the SM security service identifier, and the SM security service procedure, reference may be made to related descriptions of the foregoing blocks S201 and S202. Details are not described herein again.

It can be learned that in the solution in this embodiment of the present disclosure, the AMF entity first queries the storage function entity once by using the ID of the UE or the identifier of the slice service, to obtain an MM security service identifier and an SM security service identifier that are required by the UE or the slice service. Then, the AMF entity obtains, based on the MM security service capability of the UE and the MM security service capability of the AMF entity, the MM security service procedure supported by both the UE and the AMF entity, and obtains, based on the SM security service capability of the UE and the SM security service capability of the SMF entity, the SM security service procedure supported by both the UE and the SMF entity. Finally, the UE or a management function entity initiates a corresponding security service procedure in a network registration process or a PDU session establishment process, so that requirements of a user and a service for data security are met, a security service procedure can be obtained through negotiation by introducing a security service capability, and signaling interaction is reduced.

Figure 12:
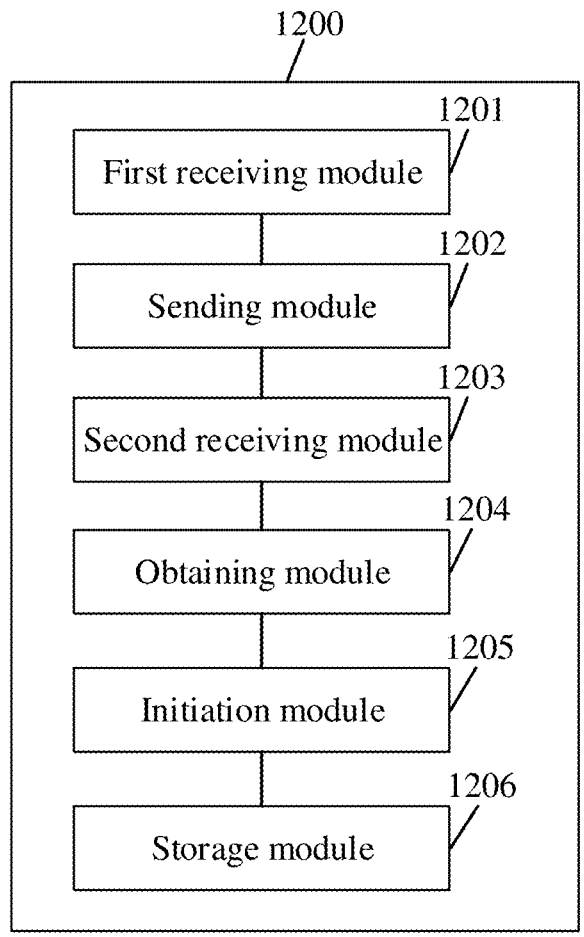
FIG. 12 is a schematic structural diagram of a management function entity according to an embodiment of the present disclosure.
Figure 13:
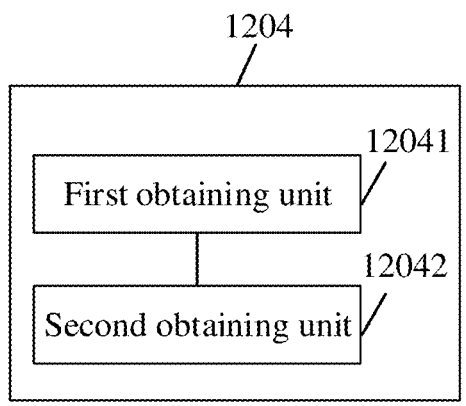
FIG. 13 is a schematic diagram of a partial structure of a management function entity according to an embodiment of the present disclosure.

FIG. 12 is a schematic structural diagram of a management function entity according to an embodiment of the present disclosure. As shown in FIG. 12, the management function entity 1200 includes: a first receiving module 1201, configured to receive a first request message sent by UE; and a sending module 1202, configured to send a second request message to a storage function entity based on the first request message, where the second request message is used to request a security service identifier for the UE, and the security service identifier is used to indicate a security service procedure.

In one embodiment, the management function entity 1200 includes an AMF entity, the security service identifier includes an MM security service identifier, and the target security service identifier includes an AMF MM security service identifier.

The MM security service identifier is used to indicate an MM security service procedure, and the AMF MM security service identifier is used to indicate an MM security service procedure to be initiated by the AMF entity.

In one embodiment, the storage function entity includes a UDM function entity, the second request message is an authentication data request, and the response message is an authentication data response.

Alternatively, the storage function entity includes a UDM function entity, the second request message is a location update request, and the response message is a location update response.

Alternatively, the storage function entity includes a PCF entity, the second request message is a UE context establishment request, and the response message is a UE context establishment response.

In one embodiment, the security service identifier further includes an SM security service identifier.

The first request message includes an SM security service capability of the UE, and the SM security service capability of the UE is used to indicate an SM security service procedure supported by the UE. The management function entity 1200 further includes a storage module 1206, a second receiving module 1203, an obtaining module 1204, and an initiation module 1205.

The storage module 1206 is configured to store the SM security service identifier and the SM security service capability of the UE.

In one embodiment, the management function entity 1200 includes a session management function SMF entity, the security service identifier includes an SM security service identifier, and the target security service identifier includes an SMF SM security service identifier.

The SM security service identifier is used to indicate an SM security service procedure, and the SMF SM security service identifier is used to indicate an SM security service procedure to be initiated by the SMF entity.

In one embodiment, the storage function entity 1200 includes a UDM function entity, the second request message includes a subscription data request, and the response message includes a subscription data response.

Alternatively, the storage function entity includes a PCF entity, the second request message is a PDU-CAN session establishment request, and the response message is a PDU-CAN session establishment response.

The second receiving module 1203 is configured to receive a response message sent by the storage function entity. The response message includes the security service identifier.

The obtaining module 1204 is configured to obtain a target security service identifier based on the security service identifier. The target security service identifier is used to indicate a security service procedure to be initiated by the management function entity.

The first request message includes an MM security service capability of the UE, and the MM security service capability of the UE is used to indicate an MM security service procedure supported by the UE. The obtaining module 1204 includes a first obtaining unit 12041.

The first obtaining unit 12041 is configured to obtain the AMF MM security service identifier based on the MM security service identifier and the MM security service capability of the UE. The AMF MM security service identifier is used to indicate an MM security service procedure to be initiated by the AMF entity.

Alternatively, the first obtaining unit 12041 is configured to obtain the AMF MM security service identifier based on the MM security service identifier, the MM security service capability of the UE, and an MM security service capability of the AMF entity. The MM security service capability of the AMF entity is used to indicate an MM security service procedure supported by the AMF entity.

The MM security service procedure indicated by the AMF MM security service identifier is an MM security service procedure supported by both the UE and the AMF entity and initiated by the AMF entity.

In one embodiment, the first request message includes an SM security service capability of the UE, and the SM security service capability of the UE is used to indicate an SM security service procedure supported by the UE. The obtaining module 1204 includes a second obtaining unit 12042.

The second obtaining unit 12042 is configured to obtain the SMF SM security service identifier based on the SM security service identifier and the SM security service capability of the UE. The SMF SM security service identifier is used to indicate an SM security service procedure to be initiated by the SMF entity.

Alternatively, the second obtaining unit 12042 is configured to obtain the SMF SM security service identifier based on the SM security service identifier, the SM security service capability of the UE, and an SM security service capability of the SMF entity. The SM security service capability of the SMF entity is used to indicate an SM security service procedure supported by the SMF entity.

The SM security service procedure identified by the SMF SM security service identifier is a security service procedure supported by both the UE and the SMF entity and initiated by the SMF entity.

The initiation module 1205 is configured to initiate the security service procedure indicated by the target security service identifier.

It should be noted that the modules (the first receiving module 1201, the sending module 1202, the second receiving module 1203, the obtaining module 1204, the initiation module 1205, and the storage module 1206) are configured to perform related operations of the foregoing methods.

In this embodiment, the management function entity 1200 is presented in a form of a module. The "module" herein may be an application-specific integrated circuit (ASIC), a processor that executes one or more software or firmware programs, a memory, an integrated logic circuit, and/or another device that can provide the foregoing functions. In addition, the first receiving module 1201, the sending module 1202, the second receiving module 1203, the obtaining module 1204, the initiation module 1205, and the storage module 1206 may be implemented by using a processor 2001 of a management function entity 2000 shown in FIG. 20.

Figure 14:
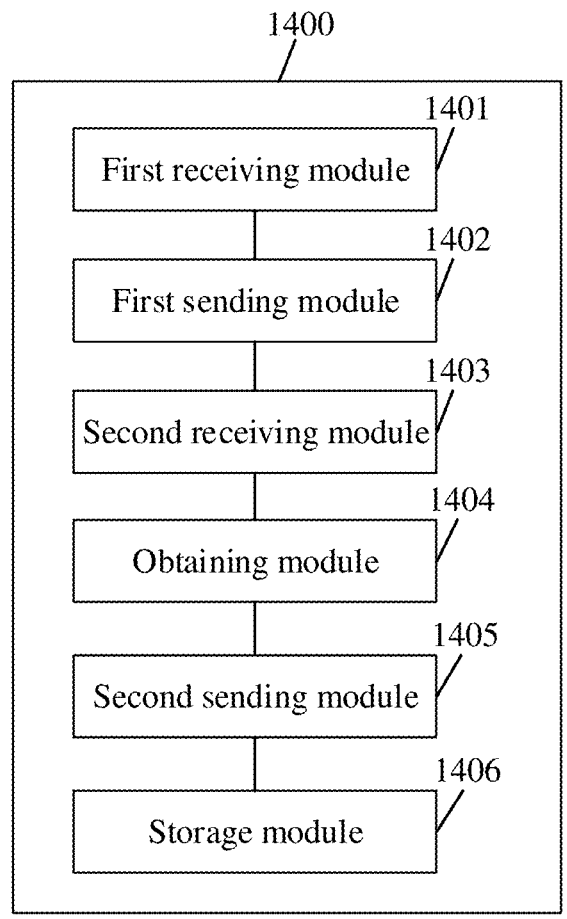
FIG. 14 is a schematic structural diagram of another management function entity according to an embodiment of the present disclosure.
Figure 15:
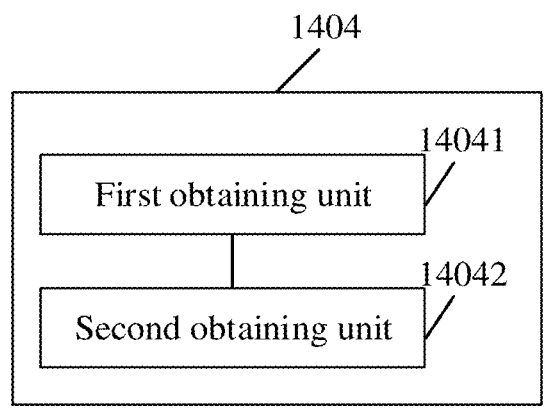
FIG. 15 is a schematic diagram of a partial structure of another management function entity according to an embodiment of the present disclosure.

FIG. 14 is a schematic structural diagram of another management function entity according to an embodiment of the present disclosure. As shown in FIG. 14, the management function entity 1400 includes: a first receiving module 1401, configured to receive a first request message sent by UE; and a first sending module 1402, configured to send a second request message to a storage function entity, where the second request message is used to request a security service identifier for the UE, and the security service identifier is used to indicate a security service procedure.

In one embodiment, the management function entity 1400 includes an AMF entity, the security service identifier includes an MM security service identifier, and the target security service identifier includes a UE MM security service identifier.

The MM security service identifier is used to indicate an MM security service procedure, and the UE MM security service identifier is used to indicate an MM security service procedure to be initiated by the UE.

In one embodiment, the storage function entity includes a UDM function entity, the second request message is an authentication data request, and the response message is an authentication data response.

Alternatively, the storage function entity is a UDM function entity, the second request message is a location update request, and the response message is a location update response.

Alternatively, the storage function entity includes a PCF entity, the second request message is a UE context establishment request, and the response message is a UE context establishment response.

In one embodiment, the security service identifier further includes an SM security service identifier.

In one embodiment, the first request message includes an SM security service capability of the UE, and the SM security service capability of the UE is used to indicate an SM security service procedure supported by the UE. The management function entity 1400 further includes a storage module 1406, a second receiving module 1403, an obtaining module 1404, and a second sending module 1405.

The storage module 1406 is configured to store the SM security service identifier and the SM security service capability of the UE.

In one embodiment, the management function entity includes an SMF entity, the security service identifier includes an SM security service identifier, and the target security service identifier includes a UE SM security service identifier.

The SM security service identifier is used to indicate an SM security service procedure, and the UE SM security service identifier is used to indicate an SM security service procedure to be initiated by the UE.

In one embodiment, the storage function entity includes a UDM function entity, the second request message is a subscription data request, and the response message is a subscription data response.

Alternatively, the storage function entity includes a PCF entity, the second request message is a PDU-CAN session establishment request, and the response message is a PDU-CAN session establishment response.

The second receiving module 1403 is configured to receive a response message sent by the storage function entity. The response message includes the security service identifier.

The obtaining module 1404 is configured to obtain a target security service identifier based on the security service identifier. The target security service identifier is used to indicate a security service procedure to be initiated by the UE.

In one embodiment, the first request message includes an MM security service capability of the UE, and the MM security service capability of the UE is used to indicate an MM security service procedure supported by the UE. The obtaining module 1404 includes a first obtaining unit 14041.

The first obtaining unit 14041 is configured to obtain the UE MM security service identifier based on the MM security service identifier and the MM security service capability of the UE.

Alternatively, the first obtaining unit 14041 is configured to obtain the UE MM security service identifier based on the MM security service identifier, the MM security service capability of the UE, and an MM security service capability of the AMF entity. The MM security service capability of the AMF entity is used to indicate an MM security service procedure supported by the AMF entity.

The MM security service procedure indicated by the UE MM security service identifier is a security service procedure supported by both the UE and the AMF entity and initiated by the UE.

In one embodiment, the first request message includes an SM security service capability of the UE, and the SM security service capability of the UE is used to indicate an SM security service procedure supported by the UE. The obtaining module 1404 includes a second obtaining unit 14042.

The second obtaining unit 14042 is configured to obtain the UE SM security service identifier based on the SM security service identifier and the SM security service capability of the UE.

Alternatively, the second obtaining unit 14042 is configured to obtain the UE SM security service identifier based on the SM security service identifier, the SM security service capability of the UE, and an SM security service capability of the SMF entity. The SM security service capability of the SMF entity is used to indicate an SM security service procedure supported by the SMF entity.

The SM security service procedure indicated by the UE SM security service identifier is a security service procedure supported by both the UE and the SMF entity and initiated by the UE.

The second sending module 1405 is configured to send the target security service identifier to the UE.

It should be noted that the modules (the first receiving module 1401, the first sending module 1402, the second receiving module 1403, the obtaining module 1404, the second sending module 1405, and the storage module 1406) are configured to perform related operations of the foregoing methods.

In this embodiment, the management function entity 1400 is presented in a form of a module. The "module" herein may be a specific ASIC, a processor that executes one or more software or firmware programs, a memory, an integrated logic circuit, and/or another device that can provide the foregoing functions. In addition, the first receiving module 1401, the first sending module 1402, the second receiving module 1403, the obtaining module 1404, the second sending module 1405, and the storage module 1406 may be implemented by using a processor 2101 of a management function entity 2100 shown in FIG. 21.

Figure 16:
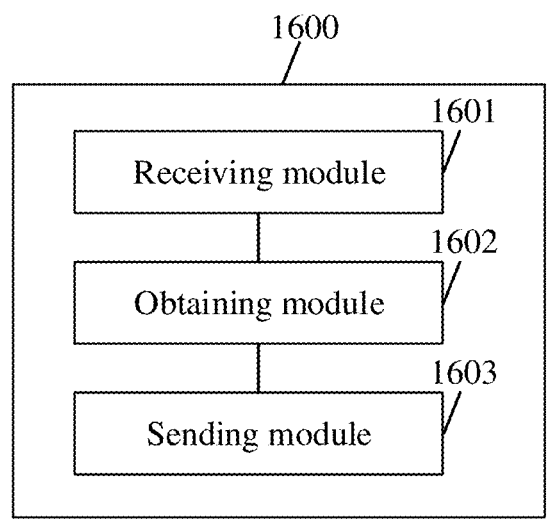
FIG. 16 is a schematic structural diagram of a storage function entity according to an embodiment of the present disclosure.

FIG. 16 is a schematic structural diagram of a storage function entity according to an embodiment of the present disclosure. As shown in FIG. 16, the storage function entity 1600 includes a receiving module 1601, an obtaining module 1602, and a sending module 1603.

The receiving module 1601 is configured to receive a request message from a management function entity. The request message is used to request a security service identifier for UE, and the request message includes an ID of the UE or an identifier of a slice service.

In one embodiment, the management function entity includes an AMF entity, the security service identifier includes an MM security service identifier, and the MM security service identifier is used to indicate an MM security service procedure.

Alternatively, the management function entity includes an AMF entity, the security service identifier includes an MM security service identifier and an SM security service identifier, and the SM security service identifier is used to indicate an SM security service procedure.

The obtaining module 1602 is configured to obtain the security service identifier based on the ID of the UE or the identifier of the slice service.

The sending module 1603 is configured to send a response message to the management function entity. The response message includes the security service identifier, and the security service identifier is used to indicate a security service procedure.

In one embodiment, the storage function entity 1600 includes a UDM function entity, the request message is an authentication data request, and the response message is an authentication data response.

Alternatively, the storage function entity 1600 includes a UDM function entity, the request message is a location update request, and the response message is a location update response.

Alternatively, the storage function entity 1600 includes a PCF entity, the request message is a UE context establishment request, and the response message is a UE context establishment response.

In one embodiment, the storage function entity 1600 includes a UDM function entity, the request message is a subscription data request, and the response message is a subscription data response.

Alternatively, the storage function entity 1600 includes a PCF entity, the request message is a PDU-CAN session establishment request, and the response message is a PDU-CAN session establishment response.

It should be noted that the modules (the receiving module 1601, the obtaining module 1602, and the sending module 1603) are configured to perform related operations of the foregoing methods.

In this embodiment, the storage function entity 1600 is presented in a form of a module. The "module" herein may be a specific ASIC, a processor that executes one or more software or firmware programs, a memory, an integrated logic circuit, and/or another device that can provide the foregoing functions. In addition, the receiving module 1601, the obtaining module 1602, and the sending module 1603 may be implemented by using a processor 2201 of a storage function entity 2200 shown in FIG. 22.

Figure 17:
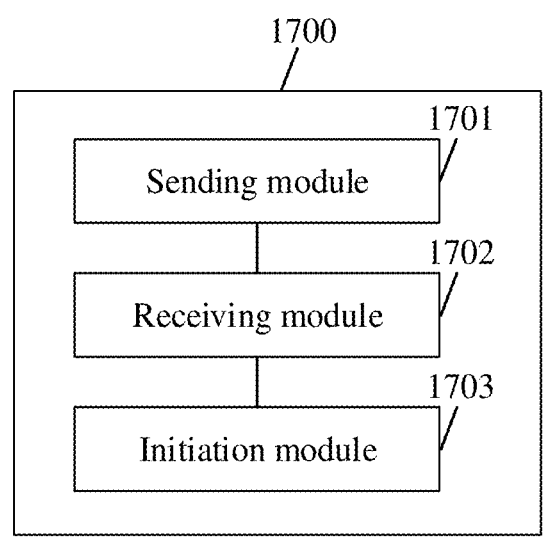
FIG. 17 is a schematic structural diagram of user equipment according to an embodiment of the present disclosure.

FIG. 17 is a schematic structural diagram of user equipment according to an embodiment of the present disclosure. As shown in FIG. 17, the user equipment 1700 includes a sending module 1701, a receiving module 1702, and an initiation module 1703.

The sending module 1701 is configured to send a request message to a management function entity.

In one embodiment, the management function entity includes an AMF entity, and the security service identifier includes an SM security service identifier or an MM security service identifier.

The SM security service identifier is used to indicate an SM security service procedure, and the MM security service identifier is used to indicate an MM security service procedure.

In one embodiment, the management function entity includes a session management function SMF entity, the security service identifier includes an SM security service identifier, and the SM security service identifier is used to indicate an SM security service procedure.

The receiving module 1702 is configured to receive a security service identifier from the management function entity. The security service identifier is used to indicate a security service procedure to be initiated by the UE.

The initiation module 1703 is configured to initiate the security service procedure indicated by the security service identifier.

It should be noted that the modules (the sending module 1701, the receiving module 1702, and the initiation module 1703) are configured to perform related operations of the foregoing methods.

In this embodiment, the user equipment 1700 is presented in a form of a module. The "module" herein may be an application-specific integrated circuit (ASIC), a processor that executes one or more software or firmware programs, a memory, an integrated logic circuit, and/or another device that can provide the foregoing functions. In addition, the sending module 1701, the receiving module 1702, and the initiation module 1703 may be implemented by using a processor 2301 of user equipment 2300 shown in FIG. 23.

Figure 18:
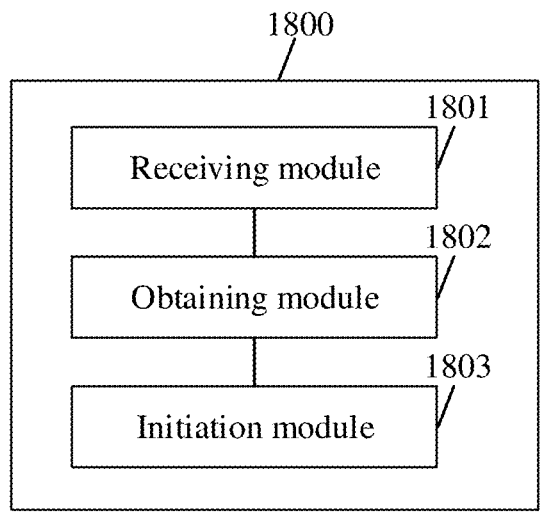
FIG. 18 is a schematic structural diagram of an SMF entity according to an embodiment of the present disclosure.

FIG. 18 is a schematic structural diagram of an SMF entity according to an embodiment of the present disclosure. As shown in FIG. 18, the SMF entity 1800 includes a receiving module 1801, an obtaining module 1802, and an initiation module 1803.

The receiving module 1801 is configured to receive an SM security service identifier of UE and an SM security service capability of the UE from an AMF entity. The SM security service identifier is used to indicate an SM security service procedure, and the SM security service capability of the UE is used to indicate an SM security service procedure supported by the UE.

The obtaining module 1802 is configured to obtain an SMF SM security service identifier based on the SM security service identifier and the SM security service capability of the UE. The SMF SM security service identifier is used to indicate an SM security service procedure to be initiated by the SMF entity.

In one embodiment, the obtaining module 1802 is further configured to obtain the SMF SM security service identifier based on the SM security service identifier, the SM security service capability of the UE, and an SM security service capability of the SMF entity. The SM security service capability of the SMF entity is used to indicate an SM security service procedure supported by the SMF entity.

The SM security service procedure indicated by the SMF SM security service identifier is a security service procedure supported by both the UE and the SMF entity and initiated by the SMF entity.

The initiation module 1803 is configured to initiate the SM security service procedure indicated by the SMF SM security service identifier.

It should be noted that the modules (the receiving module 1801, the obtaining module 1802, and the initiation module 1803) are configured to perform related operations of the foregoing methods.

In this embodiment, the SMF entity 1800 is presented in a form of a module. The "module" herein may be a specific ASIC, a processor that executes one or more software or firmware programs, a memory, an integrated logic circuit, and/or another device that can provide the foregoing functions. In addition, the receiving module 1801, the obtaining module 1802, and the initiation module 1803 may be implemented by using a processor 2401 of an SMF entity 2400 shown in FIG. 24.

Figure 19:
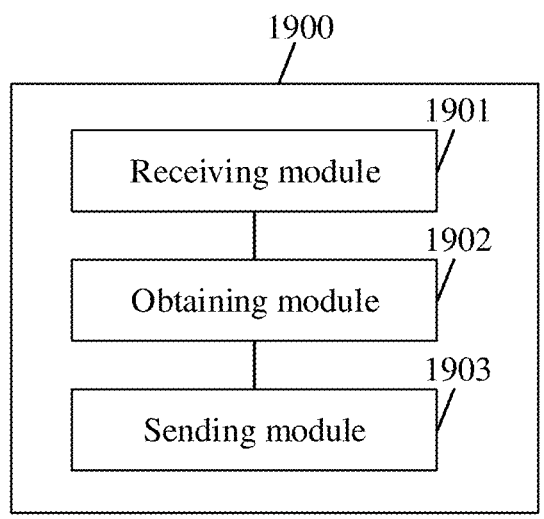
FIG. 19 is a schematic structural diagram of another SMF entity according to an embodiment of the present disclosure.

FIG. 19 is a schematic structural diagram of another SMF entity according to an embodiment of the present disclosure. As shown in FIG. 19, the SMF entity 1900 includes a receiving module 1901, an obtaining module 1902, and a sending module 1903.

The receiving module 1901 is configured to receive an SM security service identifier of UE and an SM security service capability of the UE from an AMF entity. The SM security service identifier is used to indicate an SM security service procedure, and the SM security service capability of the UE is used to indicate an SM security service procedure supported by the UE.

The obtaining module 1902 is configured to obtain a UE SM security service identifier based on the SM security service identifier and the SM security service capability of the UE. The UE SM security service identifier is used to indicate an SM security service procedure to be initiated by the UE.

In one embodiment, the obtaining module 1902 is specifically configured to obtain the UE SM security service identifier based on the SM security service identifier, the SM security service capability of the UE, and an SM security service capability of the SMF entity. The SM security service capability of the SMF entity is used to indicate an SM security service procedure supported by the SMF entity.

The SM security service procedure indicated by the UE SM security service identifier is a security service procedure supported by both the UE and the SMF entity and initiated by the UE.

The sending module 1903 is configured to send the UE SM security service identifier to the UE.

It should be noted that the modules (the receiving module 1901, the obtaining module 1902, and the sending module 1903) are configured to perform related operations of the foregoing methods.

In this embodiment, the SMF entity 1900 is presented in a form of a module. The "module" herein may be a specific ASIC, a processor that executes one or more software or firmware programs, a memory, an integrated logic circuit, and/or another device that can provide the foregoing functions. In addition, the receiving module 1901, the obtaining module 1902, and the sending module 1903 may be implemented by using a processor 2501 of an SMF entity 2500 shown in FIG. 25.

Figure 20:
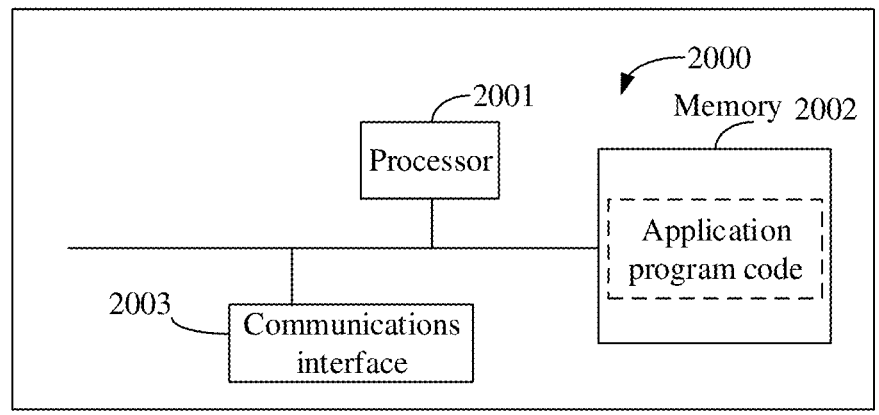
FIG. 20 is a schematic structural diagram of another management function entity according to an embodiment of the present disclosure.

As shown in FIG. 20, a management function entity 2000 may be implemented in a structure in FIG. 20. The management function entity 2000 includes at least one processor 2001, at least one memory 2002, and at least one communications interface 2003. The processor 2001, the memory 2002, and the communications interface 2003 are connected and communicate with each other by using a communications bus.

The processor 2001 may be a general-purpose central processing unit (CPU), a microprocessor, an application-specific integrated circuit (ASIC), or one or more integrated circuits that are configured to control program execution of the foregoing solutions.

The communications interface 2003 is configured to communicate with another device or a communications network, for example, the Ethernet, a radio access network (RAN), or a wireless local area network (WLAN).

The memory 2002 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated into the processor.

The memory 2002 is configured to store application program code for executing the foregoing solutions, and the processor 2001 controls the execution. The processor 2001 is configured to execute the application program code stored in the memory 2002, to implement related content of blocks S201 to S205, S802, S805 to S807', S810, S811, S814 to S816', S902, S905 to S907', S910 to S913', S1002, S1005 to S1007', S1010, S1011, S1014 to S1016', S1102, S1105 to S1107', and S1110 to S1113' in the foregoing method embodiments.

Figure 21:
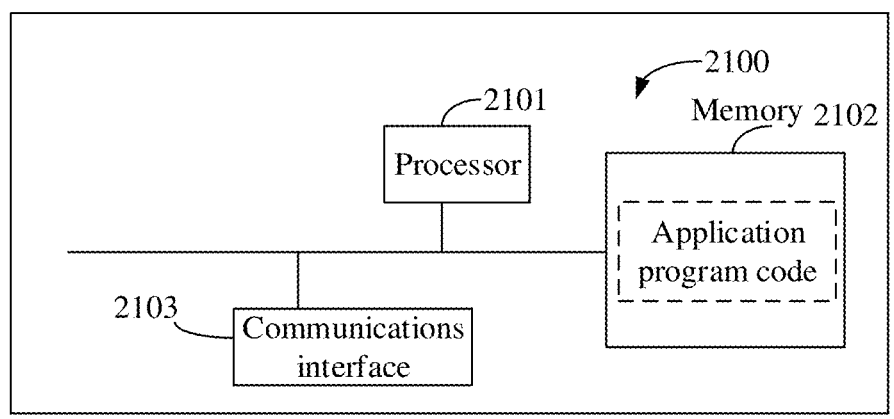
FIG. 21 is a schematic structural diagram of another management function entity according to an embodiment of the present disclosure.

As shown in FIG. 21, a management function entity 2100 may be implemented in a structure in FIG. 21. The management function entity 2100 includes at least one processor 2101, at least one memory 2102, and at least one communications interface 2103. The processor 2101, the memory 2102, and the communications interface 2103 are connected and communicate with each other by using a communications bus.

The processor 2101 may be a general-purpose central processing unit, a microprocessor, a specific ASIC, or one or more integrated circuits that are configured to control program execution of the foregoing solutions.

The communications interface 2103 is configured to communicate with another device or a communications network, for example, the Ethernet, a radio access network, or a WLAN.

The memory 2102 may be a ROM or another type of static storage device that can store static information and an instruction, or a RAM or another type of dynamic storage device that can store information and an instruction, or may be an EEPROM, a CD-ROM or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated into the processor.

The memory 2102 is configured to store application program code for executing the foregoing solutions, and the processor 2101 controls the execution. The processor 2101 is configured to execute the application program code stored in the memory 2102, to implement related content of blocks S301 to S305, S802, S805 to S807', S810, S811, S814 to S816', S902, S905 to S907', S910 to S913', S1002, S1005 to S1007', S1010, S1011, S1014 to S1016', S1102, S1105 to S1107', and S1110 to S1113' in the foregoing method embodiments.

Figure 22:
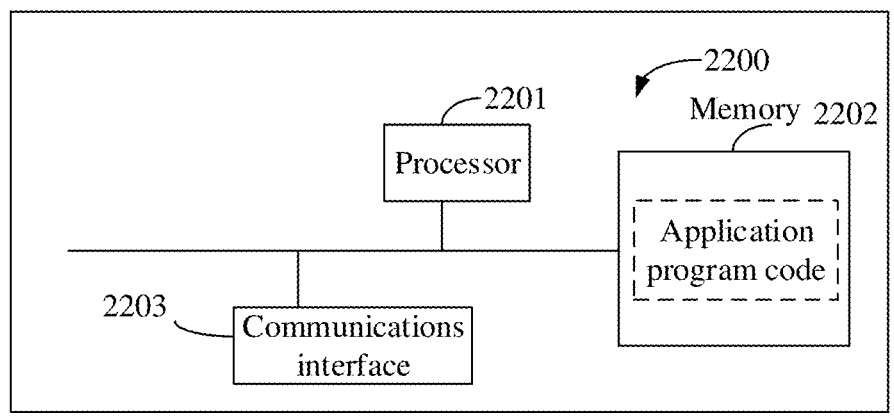
FIG. 22 is a schematic structural diagram of another storage function entity according to an embodiment of the present disclosure.

As shown in FIG. 22, a storage function entity 2200 may be implemented in a structure in FIG. 22. The storage function entity 2200 includes at least one processor 2201, at least one memory 2202, and at least one communications interface 2203. The processor 2201, the memory 2202, and the communications interface 2203 are connected and communicate with each other by using a communications bus.

The processor 2201 may be a general-purpose central processing unit, a microprocessor, a specific ASIC, or one or more integrated circuits that are configured to control program execution of the foregoing solutions.

The communications interface 2203 is configured to communicate with another device or a communications network, for example, the Ethernet, a radio access network, or a WLAN.

The memory 2202 may be a ROM or another type of static storage device that can store static information and an instruction, or a RAM or another type of dynamic storage device that can store information and an instruction, or may be an EEPROM, a CD-ROM or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated into the processor.

The memory 2202 is configured to store application program code for executing the foregoing solutions, and the processor 2201 controls the execution. The processor 2201 is configured to execute the application program code stored in the memory 2202, to implement related content of blocks S401 to S403, S803, S804, S812, S813, S903, S904, S1003, S1004, S1012, S1013, S1103, and S1104 in the foregoing method embodiments.

Figure 23:
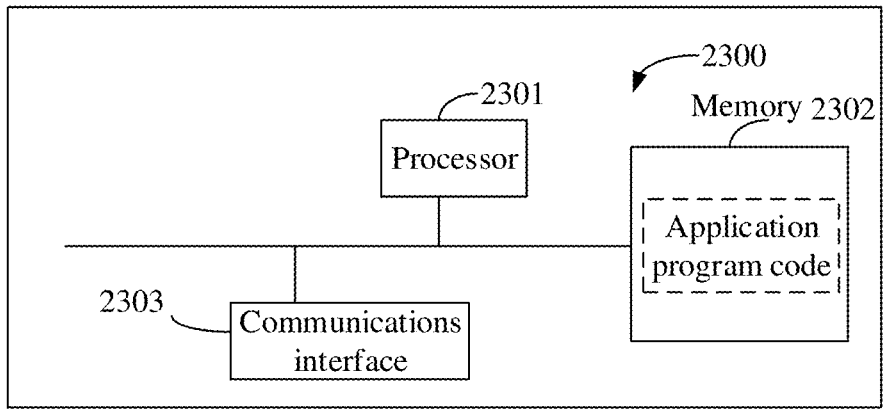
FIG. 23 is a schematic structural diagram of another user equipment according to an embodiment of the present disclosure.

As shown in FIG. 23, user equipment 2300 may be implemented in a structure in FIG. 23. The user equipment 2300 includes at least one processor 2301, at least one memory 2302, and at least one communications interface 2303. The processor 2301, the memory 2302, and the communications interface 2303 are connected and communicate with each other by using a communications bus.

The processor 2301 may be a general-purpose central processing unit, a microprocessor, a specific ASIC, or one or more integrated circuits that are configured to control program execution of the foregoing solutions.

The communications interface 2303 is configured to communicate with another device or a communications network, for example, the Ethernet, a radio access network, or a WLAN.

The memory 2302 may be a ROM or another type of static storage device that can store static information and an instruction, or a RAM or another type of dynamic storage device that can store information and an instruction, or may be an EEPROM, a CD-ROM or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated into the processor.

The memory 2302 is configured to store application program code for executing the foregoing solutions, and the processor 2301 controls the execution. The processor 2301 is configured to execute the application program code stored in the memory 2302, to implement related content of blocks S501 to S503, S801, S807, S808, S809, S816, S817, S901, S907, S909, S913, S914, S1001, S1007, S1008, S1009, S1016, S1017, S1101, S1107, S1108, S1109, S1113, and S1114 in the foregoing method embodiments.

Figure 24:
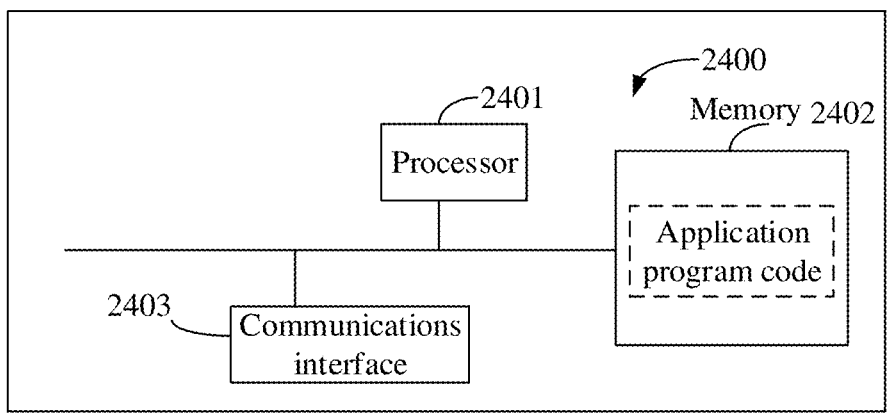
FIG. 24 is a schematic structural diagram of another SMF entity according to an embodiment of the present disclosure.

As shown in FIG. 24, an SMF entity 2400 may be implemented in a structure in FIG. 24. The SMF entity 2400 includes at least one processor 2401, at least one memory 2402, and at least one communications interface 2403. The processor 2401, the memory 2402, and the communications interface 2403 are connected and communicate with each other by using a communications bus.

The processor 2401 may be a general-purpose central processing unit, a microprocessor, a specific ASIC, or one or more integrated circuits that are configured to control program execution of the foregoing solutions.

The communications interface 2403 is configured to communicate with another device or a communications network, for example, the Ethernet, a radio access network, or a WLAN.

The memory 2402 may be a ROM or another type of static storage device that can store static information and an instruction, or a RAM or another type of dynamic storage device that can store information and an instruction, or may be an EEPROM, a CD-ROM or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated into the processor.

The memory 2402 is configured to store application program code for executing the foregoing solutions, and the processor 2401 controls the execution. The processor 2401 is configured to execute the application program code stored in the memory 2402, to implement related content of blocks S501 to S503, S811, S814 to S816', S910 to S913', S1014 to S1016', and S1110 to S1113' in the foregoing method embodiments.

Figure 25:
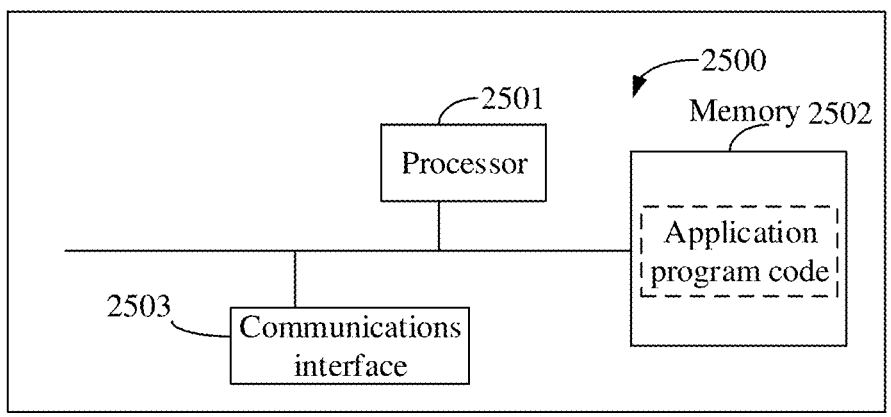
FIG. 25 is a schematic structural diagram of another SMF entity according to an embodiment of the present disclosure.

As shown in FIG. 25, a management function entity 2500 may be implemented in a structure in FIG. 25. The management function entity 2500 includes at least one processor 2501, at least one memory 2502, and at least one communications interface 2503. The processor 2501, the memory 2502, and the communications interface 2503 are connected and communicate with each other by using a communications bus.

The processor 2501 may be a general-purpose central processing unit, a microprocessor, a specific ASIC, or one or more integrated circuits that are configured to control program execution of the foregoing solutions.

The communications interface 2503 is configured to communicate with another device or a communications network, for example, the Ethernet, a radio access network, or a WLAN.

The memory 2502 may be a ROM or another type of static storage device that can store static information and an instruction, or a RAM or another type of dynamic storage device that can store information and an instruction, or may be an EEPROM, a CD-ROM or other compact disc storage, optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. The memory may alternatively be integrated into the processor.

The memory 2502 is configured to store application program code for executing the foregoing solutions, and the processor 2501 controls the execution. The processor 2501 is configured to execute the application program code stored in the memory 2502, to implement related content of blocks S601 to S603, S811, S814 to S816', S910 to S913', S1014 to S1016', and S1110 to S1113' in the foregoing method embodiments.

It should be noted that the AMF entity, the SMF entity, the UDM function entity, the PCF entity, and the NRF entity may each be a single device, or all or some of the entities may be integrated into one device.

It should be noted that for ease of description, the foregoing method embodiments are expressed as a series of actions. However, a person skilled in the art should appreciate that the present disclosure is not limited to the described action sequence, because according to the present disclosure, some operations or blocks may be performed in other sequences or performed simultaneously. In addition, a person skilled in the art should also appreciate that all the embodiments described in the specification are embodiments, and the related actions and modules are not necessarily mandatory to the present disclosure.

In the foregoing embodiments, the descriptions of the embodiments have respective focuses. For a part that is not described in detail in an embodiment, refer to related descriptions in other embodiments.

In the several embodiments provided in this application, it should be understood that the disclosed apparatus may be implemented in another manner. For example, the described apparatus embodiment is merely an example. For example, the unit division is merely logical function division. There may be another division manner in other embodiments. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer readable memory. Based on such an understanding, the technical solutions of the present disclosure essentially, or the part contributing to the prior art, or all or some of the technical solutions may be implemented in a form of a software product. The computer software product is stored in a memory and includes several instructions for instructing a computer device (which may be a personal computer, a server, a network device, or the like) to perform all or some of the operations of the methods described in the embodiments of the present disclosure. The foregoing memory includes any medium that can store program code, such as a USB flash drive, a ROM, a random access memory (RAM), a removable hard disk, a magnetic disk, or an optical disc.

A person of ordinary skill in the art may understand that all or some of the operations of the methods in the foregoing embodiments may be implemented by a program instructing related hardware. The program may be stored in a computer readable memory. The memory may include a flash memory, a ROM, a RAM, a magnetic disk, an optical disc, or the like.

The embodiments of the present disclosure are described in detail above. The principles and implementations of the present disclosure are described herein through specific examples. The description about the embodiments is merely intended to help understand the method and core ideas of the present disclosure. In addition, a person of ordinary skill in the art can make modifications to the present disclosure in terms of the specific implementations and application scopes according to the ideas of the present disclosure. In conclusion, the content of this specification shall not be construed as a limitation to the present disclosure.

What is claimed is:

1. A communication method, comprising:
receiving, by a session management function entity, a packet data unit (PDU) session establishment request from user equipment (UE);
sending, by the session management function entity, a second request message to a storage function entity based on the PDU session establishment request, wherein the second request message is used to request a session management (SM) security service identifier for the UE, and the SM security service identifier is used to indicate an SM security service procedure;
sending, by the storage function entity, a response message to the session management function entity, wherein the response message comprises the SM security service identifier;
obtaining, by the session management function entity, a session management function (SMF) SM security service identifier based on the SM security service identifier, wherein the SMF SM security service identifier is used to indicate an SM security service procedure to be initiated by the session management function entity; and
initiating, by the session management function entity, the SM security service procedure indicated by the SMF SM security service identifier.

2. The method according to claim 1, wherein the storage function entity comprises a unified data management function entity, the second request message is a subscription data request, and the response message is a subscription data response.

3. The method according to claim 1, wherein the storage function entity comprises a policy control function entity, the second request message is a packet data unit-connectivity access network (PDU-CAN) session establishment request, and the response message is a PDU-CAN session establishment response.

4. The method according to claim 1, wherein the PDU session establishment request comprises an SM security service capability of the UE, and the SM security service capability of the UE is used to indicate an SM security service procedure supported by the UE; and
the obtaining, by the session management function entity, an SMF SM security service identifier based on the SM security service identifier comprises:
obtaining, by the session management function entity, the SMF SM security service identifier based on the SM security service identifier and the SM security service capability of the UE.

5. The method according to claim 1, wherein the PDU session establishment request comprises an SM security service capability of the UE, and the SM security service capability of the UE is used to indicate an SM security service procedure supported by the UE; and
the obtaining, by the session management function entity, an SMF SM security service identifier based on the SM security service identifier comprises:
obtaining, by the session management function entity, the SMF SM security service identifier based on the SM security service identifier, the SM security service capability of the UE, and an SM security service capability of the session management function entity, wherein the SM security service capability of the session management function entity is used to indicate an SM security service procedure supported by the session management function entity, and the SM security service procedure identified by the SMF SM security service identifier is a security service procedure supported by both the UE and the session management function entity and initiated by the session management function entity.

6. The method according to claim 1, wherein the SM security service procedure comprises: a DH exchange procedure, a device authentication procedure, a user authentication procedure, a secondary authentication procedure, or an independent SM security service procedure.

7. A non-transitory computer-readable medium storing computer instructions, that when executed by one or more processors, cause the one or more processors to perform the operations of:
receiving a packet data unit (PDU) session establishment request from user equipment (UE);
sending a second request message to a storage function entity based on the PDU session establishment request, wherein the second request message is used to request a session management (SM) security service identifier for the UE, and the SM security service identifier is used to indicate an SM security service procedure;
receiving a response message from the storage function entity, wherein the response message comprises the SM security service identifier;
obtaining a session management function (SMF) SM security service identifier based on the SM security service identifier, wherein the SMF SM security service identifier is used to indicate an SM security service procedure to be initiated by a session management function entity; and
initiating the SM security service procedure indicated by the SMF SM security service identifier.

8. The medium according to claim 7, wherein the storage function entity comprises a unified data management function entity, the second request message is a subscription data request, and the response message is a subscription data response.

9. The medium according to claim 7, wherein the storage function entity comprises a policy control function entity, the second request message is a packet data unit-connectivity access network (PDU-CAN) session establishment request, and the response message is a PDU-CAN session establishment response.

10. The medium according to claim 7, wherein the PDU session establishment request comprises an SM security service capability of the UE, and the SM security service capability of the UE is used to indicate an SM security service procedure supported by the UE; and the computer instructions further cause the one or more processors to perform the operation of:
obtaining the SMF SM security service identifier based on the SM security service identifier and the SM security service capability of the UE.

11. The medium according to claim 7, wherein the PDU session establishment request comprises an SM security service capability of the UE, and the SM security service capability of the UE is used to indicate an SM security service procedure supported by the UE; and the computer instructions further cause the one or more processors to perform the operation of:
obtaining the SMF SM security service identifier based on the SM security service identifier, the SM security service capability of the UE, and an SM security service capability of the session management function entity, wherein the SM security service capability of the session management function entity is used to indicate an SM security service procedure supported by the session management function entity, and the SM security service procedure identified by the SMF SM security service identifier is a security service procedure supported by both the UE and the session management function entity and initiated by the session management function entity.

12. The medium according to claim 7, wherein the SM security service procedure comprises: a DH exchange procedure, a device authentication procedure, a user authentication procedure, a secondary authentication procedure, or an independent SM security service procedure.

13. A system, comprising: a session management function entity and a storage function entity, wherein
the session management function entity, configured to receive a packet data unit (PDU) session establishment request from user equipment (UE); and send a second request message to the storage function entity based on the PDU session establishment request, wherein the second request message is used to request a session management (SM) security service identifier for the UE, and the SM security service identifier is used to indicate an SM security service procedure;
the storage function entity, configured to send a response message, wherein the response message comprises the SM security service identifier;
the session management function entity, further configured to obtain a session management function (SMF) SM security service identifier based on the SM security service identifier, wherein the SMF SM security service identifier is used to indicate an SM security service procedure to be initiated by the session management function entity; and initiate the SM security service procedure indicated by the SMF SM security service identifier.

14. The system according to claim 13, wherein the storage function entity comprises a unified data management function entity, the second request message is a subscription data request, and the response message is a subscription data response.

15. The system according to claim 13, wherein the storage function entity comprises a policy control function entity, the second request message is a packet data unit-connectivity access network (PDU-CAN) session establishment request, and the response message is a PDU-CAN session establishment response.

16. The system according to claim 13, wherein the PDU session establishment request comprises an SM security service capability of the UE, and the SM security service capability of the UE is used to indicate an SM security service procedure supported by the UE; and the session management function entity is further configured to:
obtain the SMF SM security service identifier based on the SM security service identifier and the SM security service capability of the UE.

17. The system according to claim 13, wherein the PDU session establishment request comprises an SM security service capability of the UE, and the SM security service capability of the UE is used to indicate an SM security service procedure supported by the UE; and the session management function entity is further configured to:
obtain the SMF SM security service identifier based on the SM security service identifier, the SM security service capability of the UE, and an SM security service capability of the session management function entity, wherein the SM security service capability of the session management function entity is used to indicate an SM security service procedure supported by the session management function entity, and the SM security service procedure identified by the SMF SM security service identifier is a security service procedure supported by both the UE and the session management function entity and initiated by the session management function entity.

18. The system according to claim 13, wherein the SM security service procedure comprises: a DH exchange procedure, a device authentication procedure, a user authentication procedure, a secondary authentication procedure, or an independent SM security service procedure.

* * * * *